United States Patent [19]

Brown et al.

[11] Patent Number: 5,272,630

[45] Date of Patent: Dec. 21, 1993

[54] AUTOMATIC TRANSMISSION CONTROL AND STRATEGY FOR NEUTRAL IDLE

[75] Inventors: Larry T. Brown; Marvin P. Kraska, both of Dearborn, Mich.

[73] Assignee: Ford Motor Company, Dearborn, Mich.

[21] Appl. No.: 945,067

[22] Filed: Sep. 15, 1992

[51] Int. Cl.$^5$ .................. G06F 15/50; F16D 21/08; B60K 41/04

[52] U.S. Cl. .................. 364/424.1; 74/866; 74/867; 192/87.17; 192/0.076

[58] Field of Search ............... 364/424.1; 74/866, 867; 192/0.033, 0.052, 0.055

[56] References Cited

U.S. PATENT DOCUMENTS

| | | | |
|---|---|---|---|
| 2,608,880 | 9/1952 | Flinn | 74/472 |
| 4,476,745 | 10/1984 | Moan | 74/866 |
| 4,514,811 | 4/1985 | Daubenmier et al. | 364/424.1 |
| 4,526,065 | 7/1985 | Rosen et al. | 74/869 |
| 4,576,265 | 3/1986 | Kumura et al. | 192/0.055 |
| 4,618,042 | 10/1986 | Yamamoto | 192/0.044 |
| 4,633,985 | 1/1987 | Leorat | 192/0.055 |
| 4,644,826 | 2/1987 | Kubo et al. | 74/866 |
| 4,694,709 | 9/1987 | Kikuchi et al. | 74/866 |
| 4,730,708 | 3/1988 | Hamano et al. | 192/0.033 |
| 4,821,190 | 4/1989 | Patil | 364/424.1 |
| 4,915,204 | 4/1990 | Klotz et al. | 192/87.17 |
| 4,933,527 | 7/1990 | Bendford et al. | 364/424.1 |
| 4,936,167 | 7/1990 | Mehta | 74/866 |
| 4,965,728 | 10/1990 | Leising et al. | 364/424.1 |
| 5,150,297 | 9/1992 | Daubenmier et al. | 364/424.1 |

*Primary Examiner*—Gary Chin
*Assistant Examiner*—Jacques H. Louis-Jacques
*Attorney, Agent, or Firm*—Roger L. May; Frank G. McKenzie

[57] ABSTRACT

An automatic transmission for an automotive vehicle having an automatic ratio control wherein provision is made for disengaging a forward-drive clutch which forms a part of the torque flow path from an engine to the torque input element of multiple-ratio gearing and for disengaging the forward-drive clutch when the vehicle is stopped and the vehicle engine is idling and wherein provision is made for engaging the clutch to condition the transmission for torque delivery, the engagement being controlled by an electronic microprocessor as part of a closed control loop, thereby minimizing inertia torque disturbances when the clutch is engaged upon the initiation of the vehicle acceleration mode from a standing start.

8 Claims, 14 Drawing Sheets

|      | REV | FWD | DIR | LO/REV | 5CL | 2/4 BAND | HB & REV BAND | 1-4GR OWC |
|------|-----|-----|-----|--------|-----|----------|---------------|-----------|
| 1st  |     | X   |     | X      |     |          | HB            | X         |
| 2nd  |     | X   |     |        |     | X        | HB            | X         |
| 3rd  |     | X   | X   |        |     |          | HB            | X         |
| 4th  |     |     | X   |        |     | X        | HB            | X         |
| 5th  |     |     | X   |        | X   | X        |               |           |
| REV  | X   |     |     | X      |     |          |               |           |

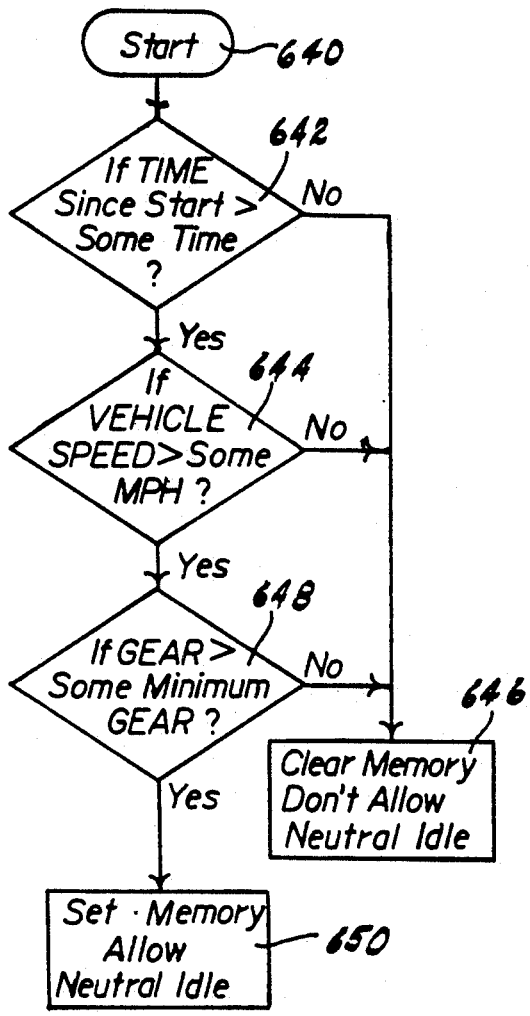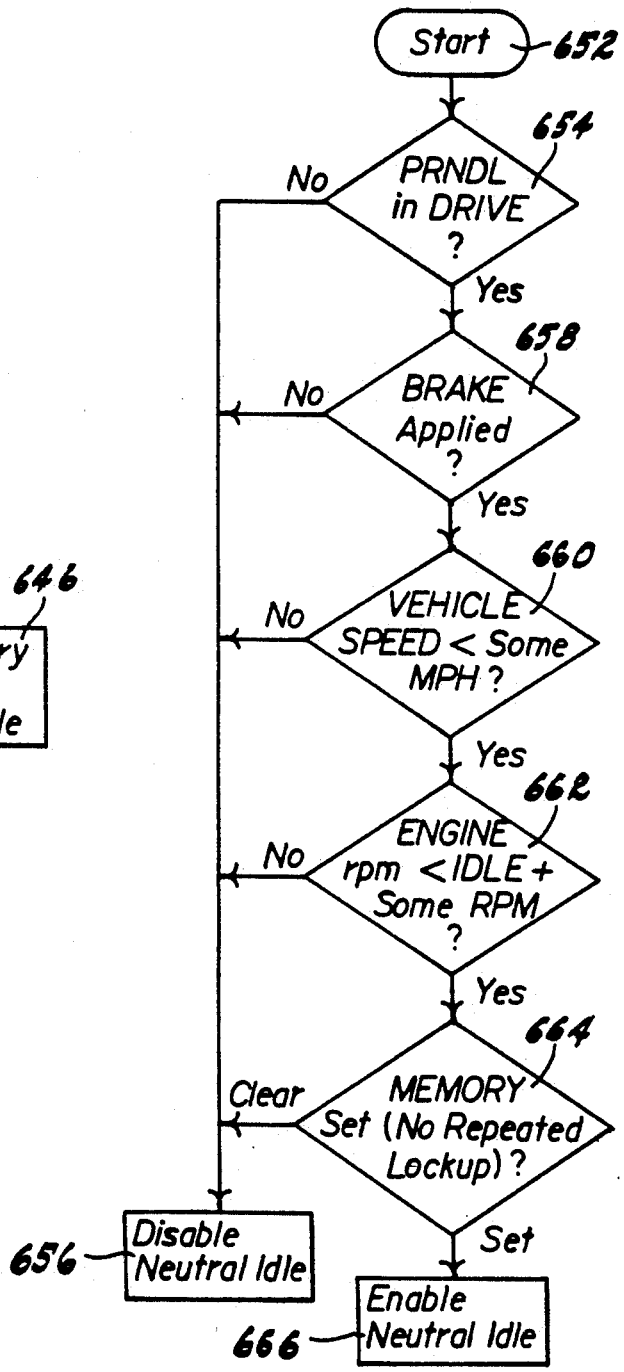
FIG. 11
FIG. 12

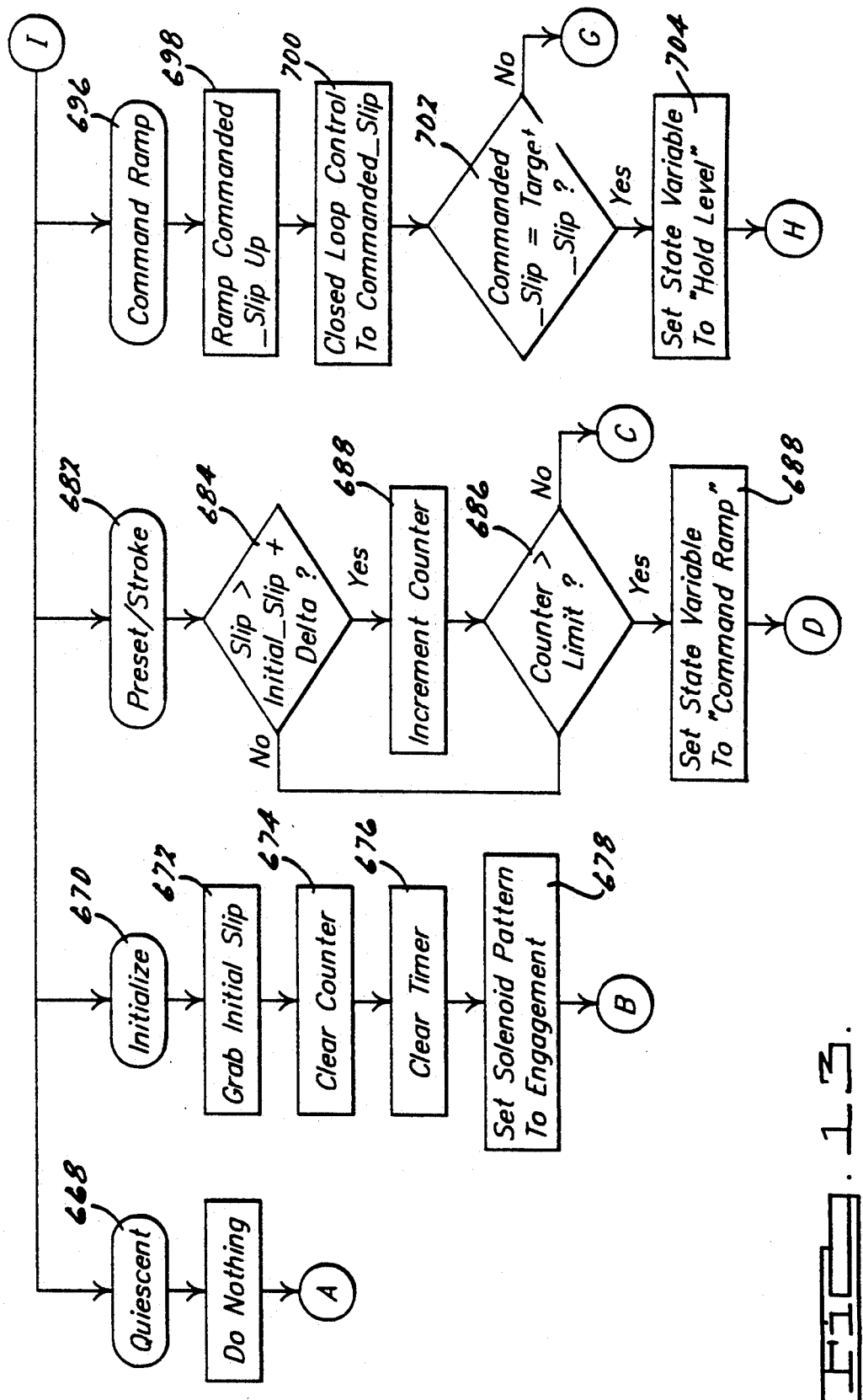

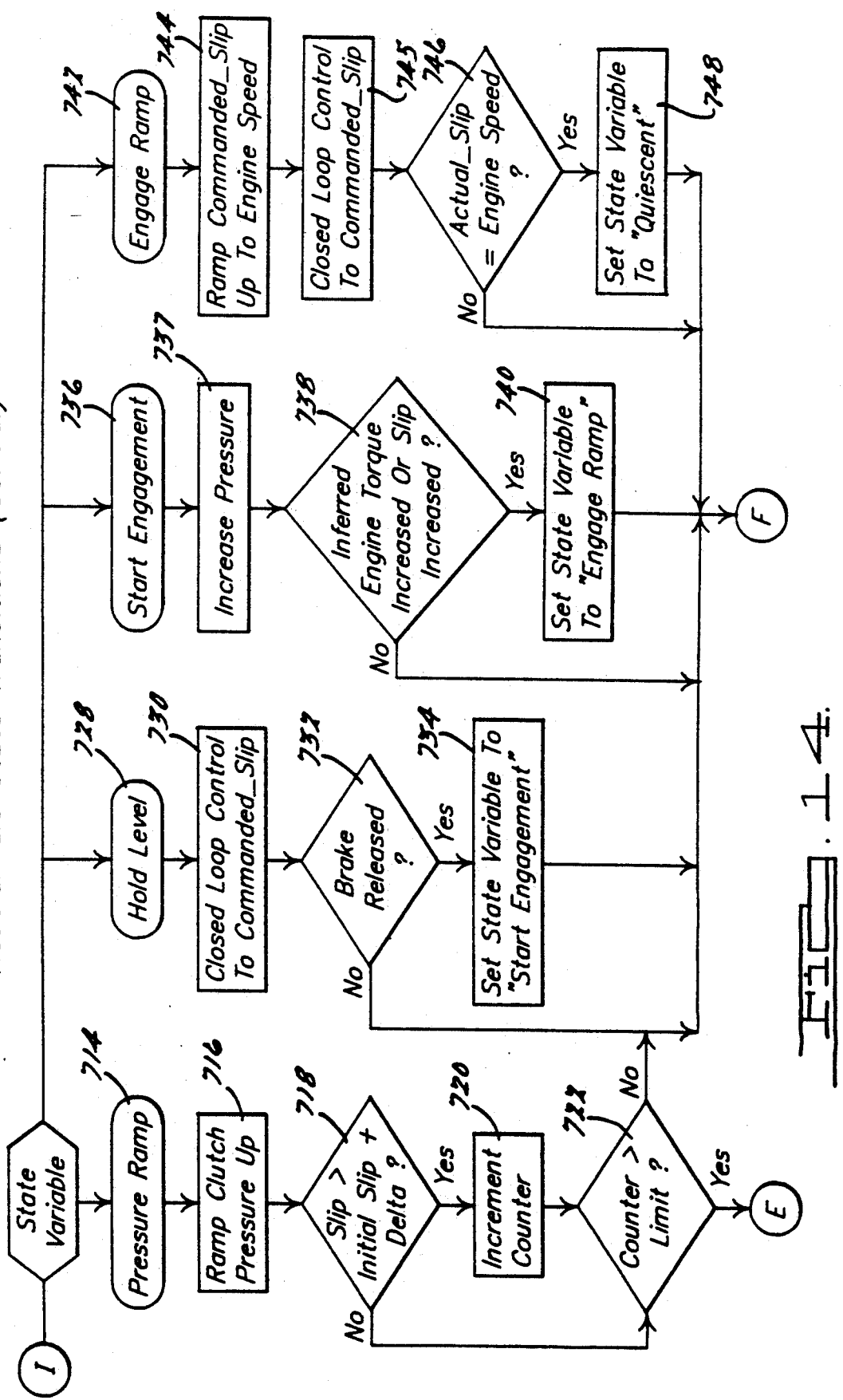

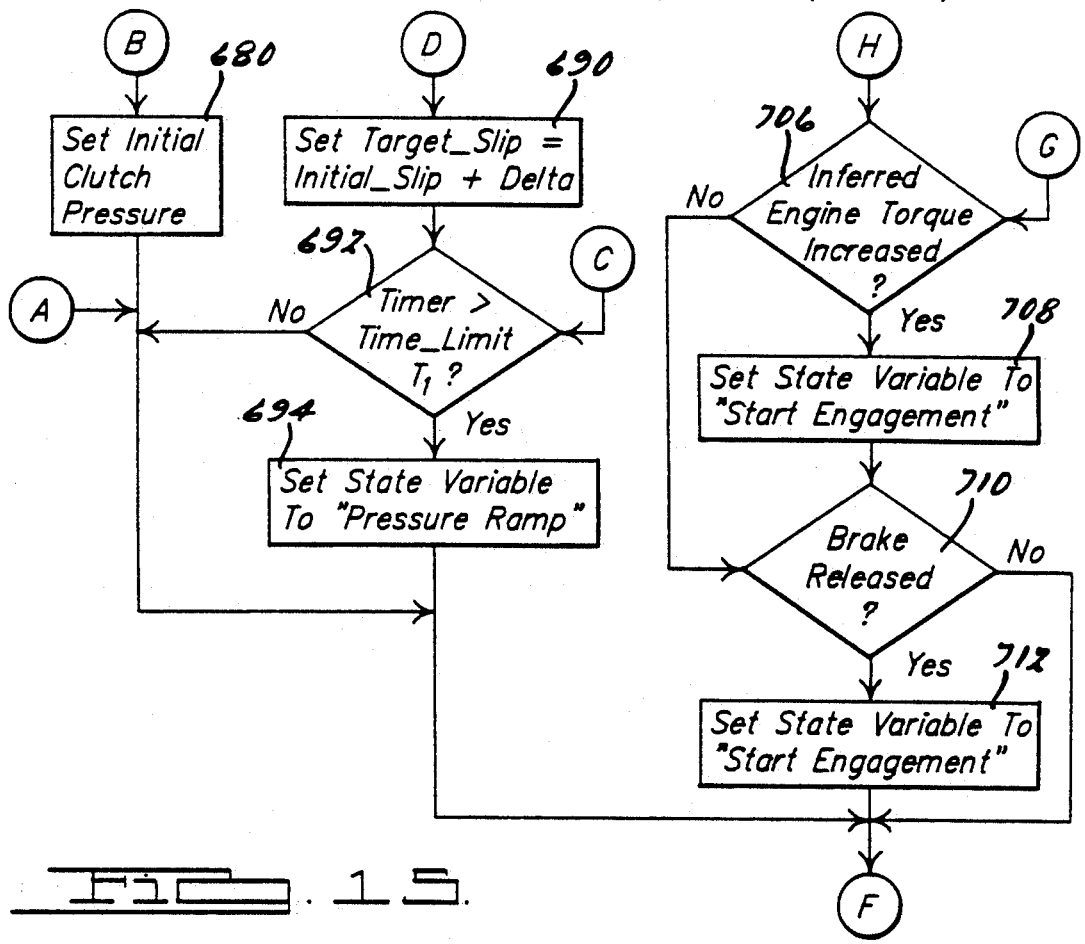
Fig. 15. Neutral Idle State Transitions (Cont'd.)
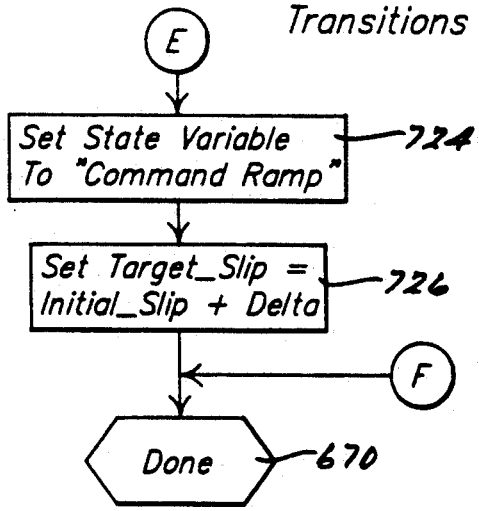
Fig. 16. Neutral Idle State Transitions (Cont'd.)

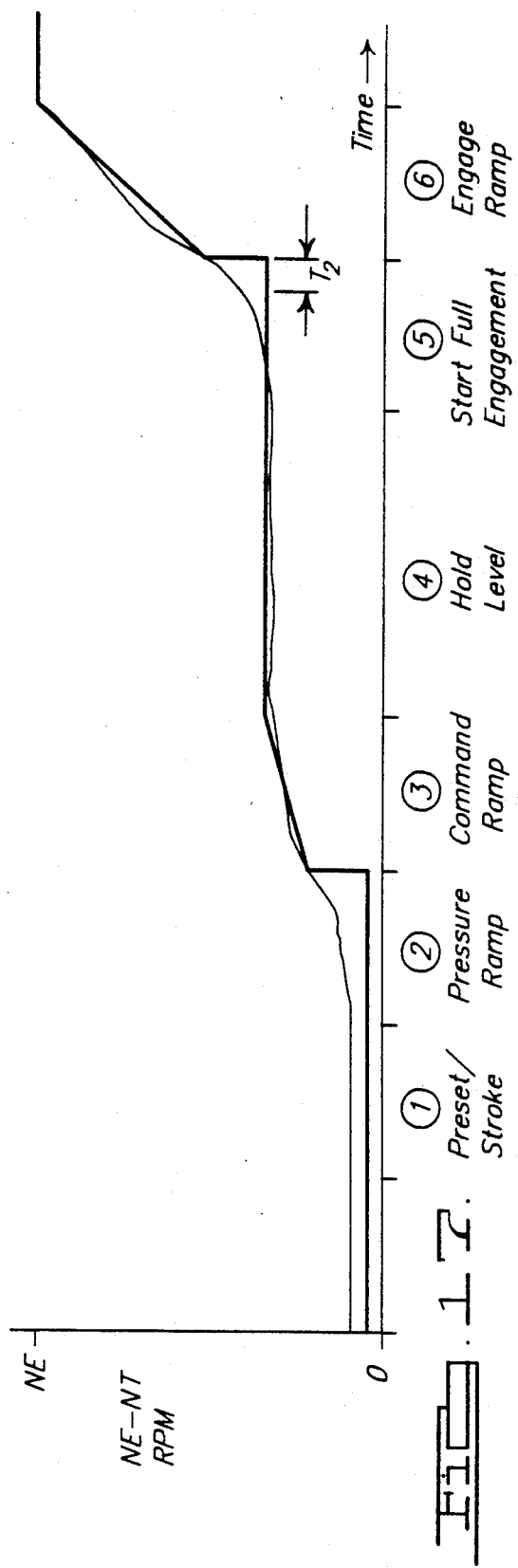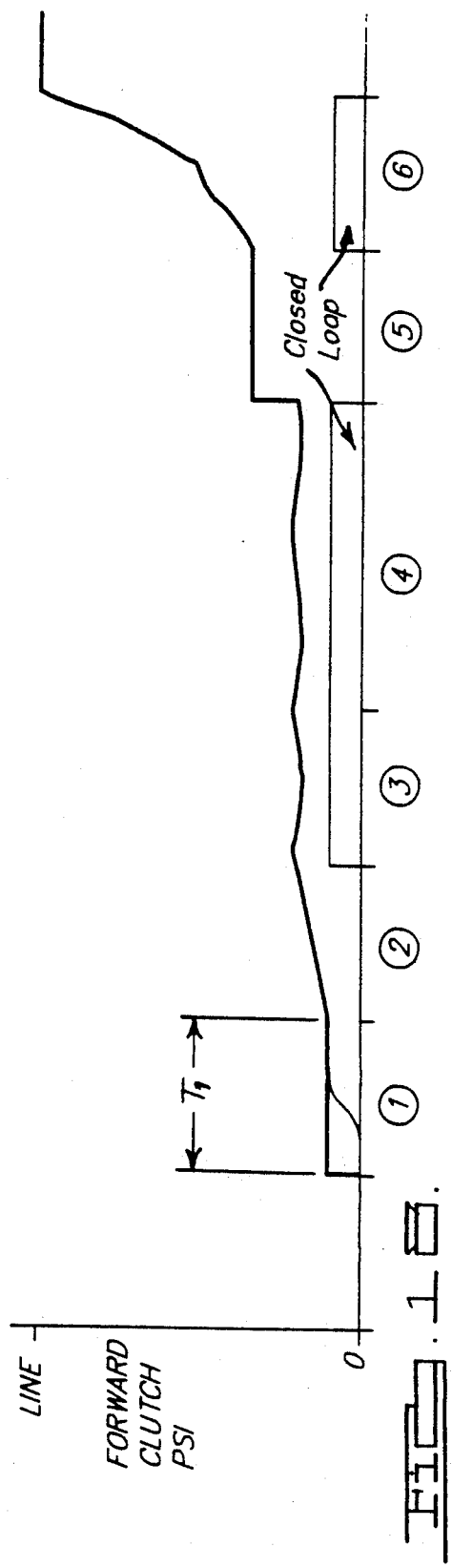

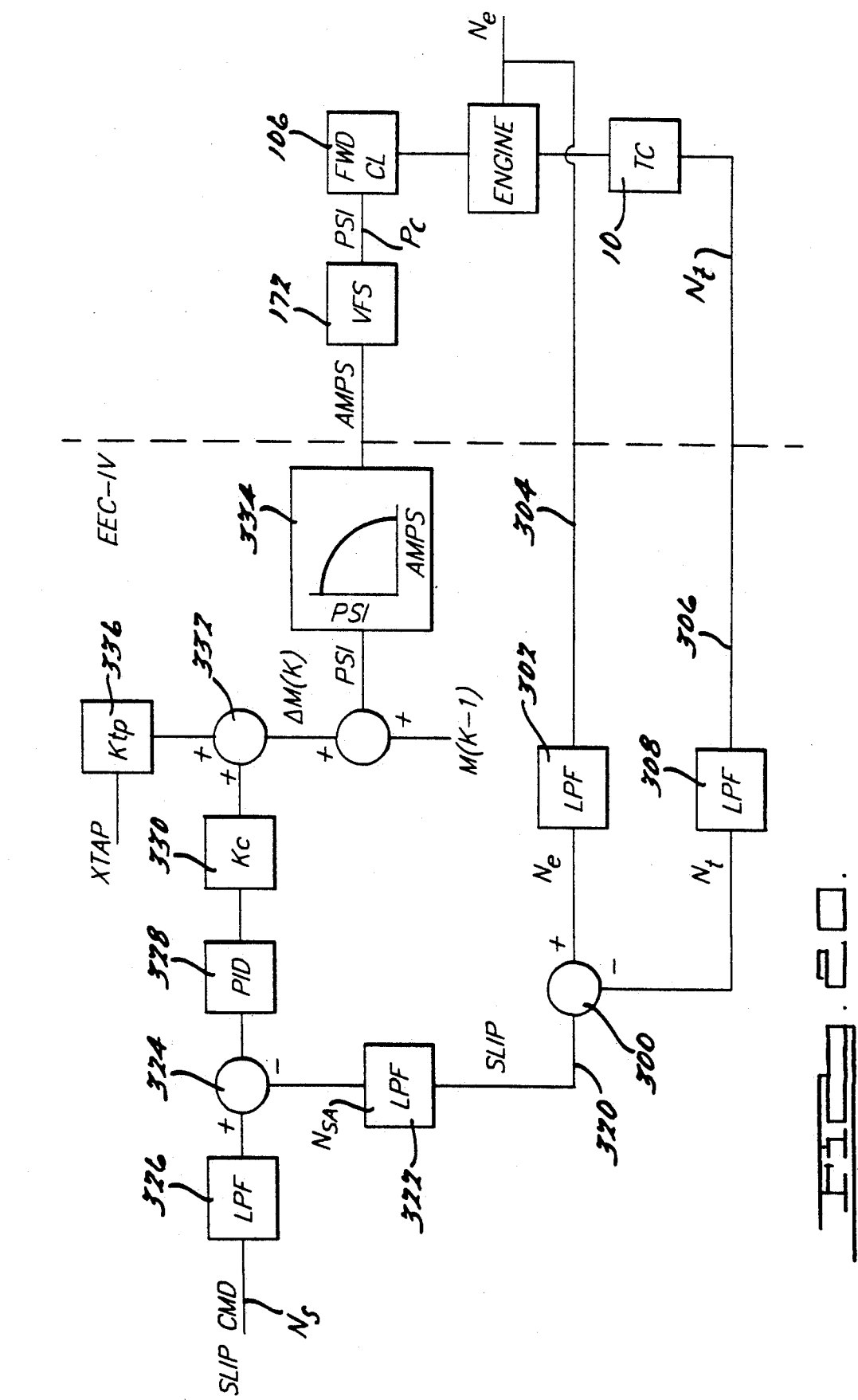

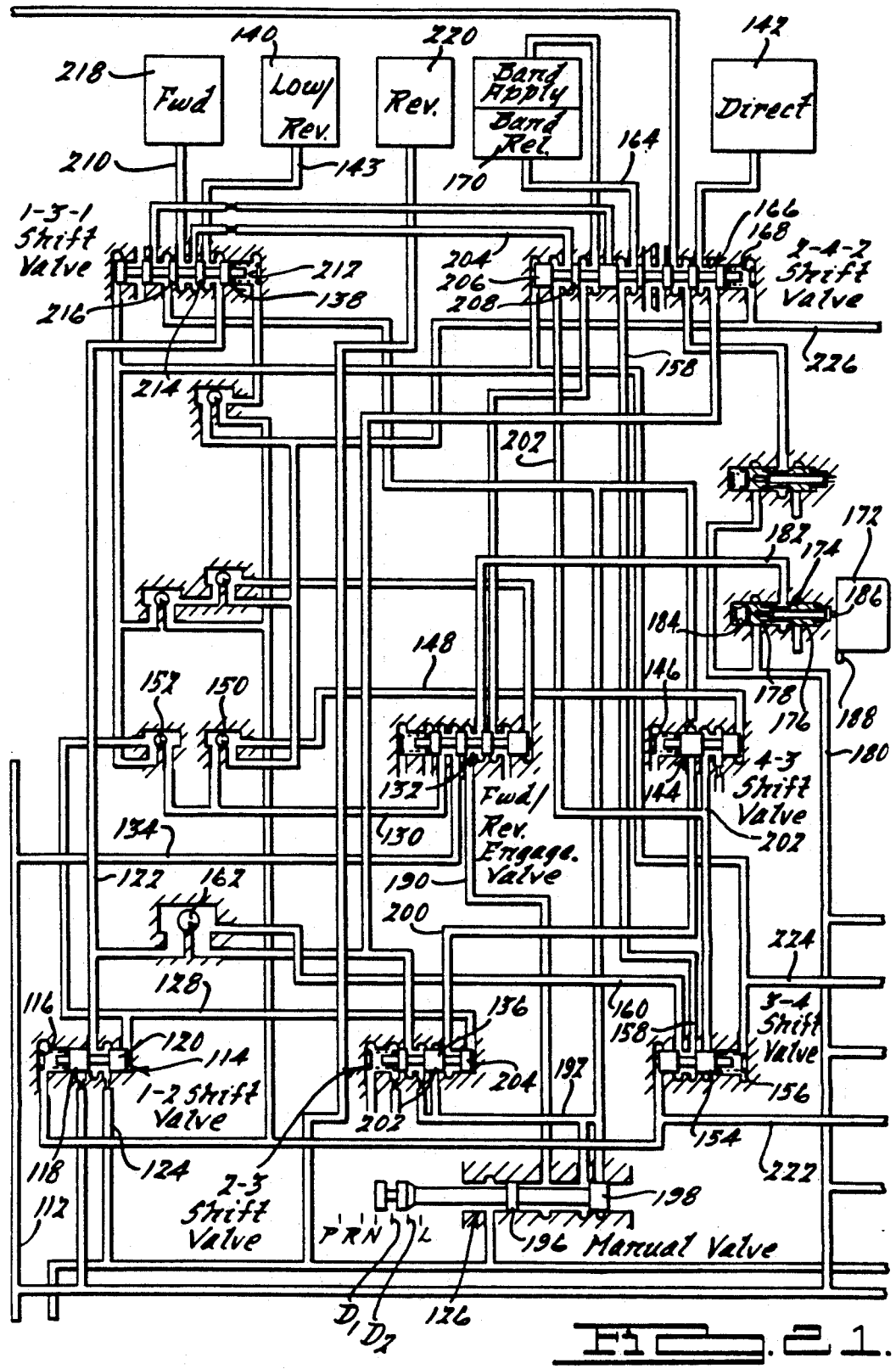

AUTOMATIC TRANSMISSION CONTROL AND STRATEGY FOR NEUTRAL IDLE

TECHNICAL FIELD OF THE INVENTION

An automatic control system for an automotive vehicle having a throttle-controlled internal combustion engine and multiple-ratio gearing for establishing torque flow paths from the engine to the vehicle traction wheels.

BACKGROUND OF THE INVENTION

Our invention is adapted to be used in an automatic transmission for an automotive vehicle having an internal combustion engine, multiple-ratio gearing and a hydrokinetic torque converter located between the engine crankshaft and the torque input elements of the gearing. It is adaptable also for use with a neutral clutch for a continuously variable transmission or for certain semi-automatic transmissions. The output elements of the gearing are adapted to be drivably connected to vehicle traction wheels. An example of a transmission of this kind is disclosed in U.S. Pat. No. 4,526,065 and in U.S. Pat. No. 4,476,745. Each of these patents is assigned to the assignee of the present invention.

The transmission disclosed in the '745 and the '065 patents includes an internal combustion engine having a crankshaft connected to the impeller of a hydrokinetic torque converter. Multiple-ratio gearing provides plural torque flow paths between the turbine of the hydrokinetic torque converter and the vehicle traction wheels. Fluid pressure-operated clutches and brakes establish and disestablish torque flow paths between the turbine and driven elements of the gearing. Fluid pressure-operated servos actuate the clutches and brakes.

The servos for controlling the clutches and brakes include a forward-drive clutch servo that is actuated during operation in each underdrive ratio as well as the direct-drive ratio. The torque of the engine is multiplied by the converter and distributed to the torque input elements of the gearing through the forward-drive clutch. This is true even in those instances when the vehicle is idling. Thus, a torque flow path is established when the vehicle is not moving but when the engine is idling and the transmission is in the forward drive position.

The control systems of the '745 patent and the '065 patent include driver-operated range selector valves which have park or neutral positions as well as a forward-drive position, each position being established by a driver-operated manual valve detent. The torque flow path can be interrupted by adjusting the driver-operated manual valve to the neutral position, thereby disengaging the forward-drive clutch.

If the vehicle engine should be idling when the vehicle is stopped and if the manual valve is moved to the drive position, the engine will be loaded because the impeller of the converter will continue to be connected to the crankshaft of the engine as the turbine is stalled. Thus there is a speed ratio developed across the converter, although the torque delivered through the converter is at a minimum value because of the idle condition of the engine.

In order to avoid torque disturbances and roughness in the idle state, it is necessary for the engine to be calibrated so that the engine control strategy will provide sufficient fuel to maintain a smooth idle while the vehicle is stalled and the manual valve is in the drive range position. The noise, vibration and harshness (NVH) of the powertrain may be severe because of the direct torque flow path between the turbine and the driven elements of the transmission in contrast to the NVH characteristics for the full neutral condition when the manual valve is in the neutral position.

The requirement to increase the fuel supply by advancing the throttle during idle condition reduces the effective fuel economy of the driveline. Further, undesirable exhaust emission levels are possible when the driveline is loaded in this fashion with the engine in its idle condition.

BRIEF DESCRIPTION OF THE INVENTION

Our invention comprises a control strategy and a control system for maintaining the transmission in a neutral state even if the driver-operated manual valve is moved to the drive detent position when the vehicle is stalled and the engine is idling. In this manner, it is possible to take advantage of the fuel savings compared to a driveline in which the converter is in its operative torque multiplication mode. Our invention further makes it possible to reduce the undesirable noise, vibration and harshness features of the driveline when the engine is idling in the neutral state. This is accomplished while maintaining the ability of the driveline to respond to a sudden driver demand for torque at the beginning of the acceleration mode.

We are aware of prior art teachings that attempt to avoid the problems associated with noise, vibration and harshness of the engine during operation of the engine with the vehicle stalled. This may be accomplished by disengaging the forward-drive clutch so that the turbine of the hydrokinetic torque converter is disconnected from the torque input elements of the gearing. One example of this is shown in the previously described U.S. Pat. No. 4,526,065 where a control system includes a solenoid-operated brake neutral valve situated in the circuitry that establishes fluid communication between a pressure source and the forward-drive clutch servo. The brake neutral valve assumes its open hydraulic circuit condition when the brakes of the vehicle are applied and when the vehicle engine throttle valve is closed.

A disadvantage of the control system of the kind shown in the '065 patent is the harshness in the engagement of the forward-drive clutch when the vehicle operator removes vehicle brake pressure and advances the accelerator to initiate vehicle acceleration. The forward-drive clutch will engage in an open-loop fashion, thus resulting in harshness in the clutch engagement.

An attempt is made in the control system of U.S. Pat. No. 4,476,745 to overcome the harshness in the engagement of the forward clutch by providing a clutch pressure regulator valve and an orifice bypass control valve located in the fluid circuit that connects the driver-operated manual valve to the clutch servo for the forward clutch.

The control valve system of our present invention is distinctive from prior art attempts to achieve smooth engagement of the forward-drive clutch following the neutral idle state. This is achieved by providing a closed-loop clutch engagement control circuit. In the prior art systems, when the forward clutch is vented to establish a neutral state, a sudden torque output shaft torque bump or transient torque spike is apparent when the driver advances the throttle of the engine. This is due, in part, to the time required to fill the clutch servo with working pressure fluid and to stroke the piston of the servo. As the piston is stroking, the engine speed increases due to the advancement of the accelerator pedal. The increased engine speed results in unacceptable transient torque fluctuations.

The improved control system of our invention makes it possible to supply a residual or threshold pressure to the servo and to engage the clutch at the beginning of the acceleration mode by means of a closed-loop controller that assures that the forward clutch will be filled and stroked and ready to be fully applied when the throttle is advanced by the driver. Because of the closed-loop characteristics, spring force tolerances in the servo do not affect the quality of the clutch engagement and torque variations due to changes in clutch pressure because of hydraulic temperature changes do not result in a deviation from the optimum clutch engagement pattern.

The closed-loop system of our invention automatically compensates for changes in oil temperature and variables such as spring force tolerances so that each clutch engagement is repeatable. Further, changes in the calibration of the forward clutch will not provide engagement characteristic changes as the friction surfaces of the clutch are subjected to wear. Also, differences in driver habits with respect to the rate of advancement of the accelerator pedal during acceleration mode will not affect the quality of the clutch engagement.

BRIEF DESCRIPTION OF THE FIGURES OF THE DRAWINGS

FIG. 11 is a flow diagram showing the strategy for inhibiting the neutral idle state if the proper vehicle operating conditions are not established.

FIG. 12 is a flow diagram showing the strategy that is in effect when the neutral idle state is in place.

FIGS. 13, 14, 15 and 16 are flow charts showing the neutral idle state transitions for the forward-drive clutch beginning with the initial quiescent state and ending with the full engagement state.

FIG. 17 is a plot of the converter slip versus time starting with a clutch piston prestroke condition and ending with a final full clutch engagement state.

FIG. 18 is a chart similar to FIG. 17 showing the clutch pressure that exists at each of the stages that corresponds to the neutral idle state transitions of FIGS. 13-16.

FIG. 20 is a closed-loop controller engagement schematic.

FIG. 21 is a valve circuit diagram for controlling the clutches and brakes in a transmission of the kind illustrated in FIG. 1.

PARTICULAR DESCRIPTION OF THE INVENTION

Figure 1:
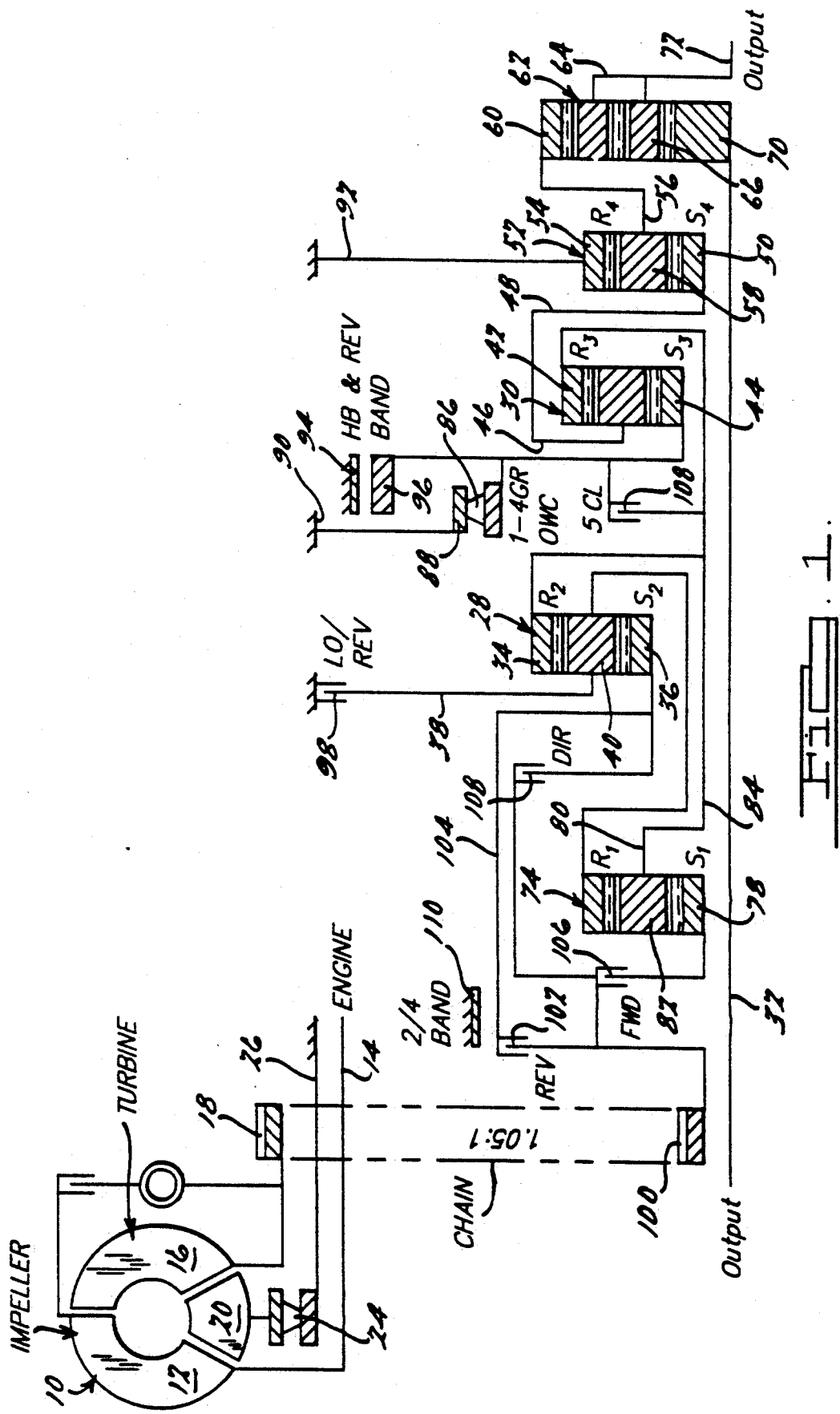
FIG. 1 is a schematic representation of a planetary gear transmission having a forward clutch located in the torque flow path between the hydrokinetic torque converter turbine and the input elements of the gearing.

Numeral 10 designates a hydrokinetic torque converter having a bladed impeller 12 connected drivably to a vehicle engine crankshaft 14. A bladed turbine 16 is connected to drive sprocket 18 of a chain transfer drive. A bladed stator 20 is located between the toroidal flow exit section of the turbine of the turbine flow entrance section of the impeller and acts in known fashion to change the direction of the toroidal fluid flow, thus making possible a torque multiplication in the torque converter 10.

During steady-state operation in higher gear ratios, a friction bypass clutch 22 may be engaged to connect drivably the impeller 12 and the turbine 16, thus effectively removing the hydrokinetic torque flow path from the driveline.

Stator 20 is anchored against rotation in a direction opposite to the direction of rotation of the impeller by an overrunning brake 24, which is grounded to stator sleeve shaft 26.

A pair of simple planetary gear units 28 and 30 is mounted rotatably about the axis of upward shaft 32 which is arranged in spaced parallel disposition with respect to the engine crankshaft axis. Unit 28 includes ring gear 34, sun gear 36, carrier 38 and planet pinions 40 which are journalled on carrier 38 in meshing engagement with ring gear 34 and sun gear 36. Gear unit 30 comprises ring gear 42, sun gear 44, carrier 46 and planet pinions 48, which are journalled on carrier 46 in meshing engagement with sun gear 44 and ring gear 42. Carrier 46 forms a torque output element for the gearing and is connected drivably to output member 48, which is connected to final drive sun gear 50 of final drive planetary gear unit 52.

Final drive gear unit 52 includes, in addition to sun gear 50, a ring gear 54, a carrier 56 and planet pinions 58 journalled on carrier 56 in meshing engagement with sun gear 50 and ring gear 54. Carrier 56 acts as a torque output element of the gear unit 52 and is connected to ring gear 60 and differential gear unit 62.

A compound carrier 64 forms a part of the gear unit 62. It rotatably journals a first pair of pinions 66, which mesh with a ring gear 60 and with a second set of planetary pinions 68, the latter meshing with sun gear 70. Sun gear 70 in turn is drivably connected to output shaft 32.

Carrier 64 is drivably connected to a companion torque output shaft 72. Shaft 32 is connected to one traction wheel of the vehicle, and the opposite traction wheel of the vehicle is connected to output shaft 72. The connections between the traction wheels and the respective output shafts is achieved by universal coupling and half shaft assemblies in known fashion.

A third simple planetary gear unit 74 is located between the pair of gear units previously described and the hydrokinetic torque converter. It comprises a ring gear 76, a sun gear 78, a carrier 80 and planet pinions 82 journalled on the carrier 80 in meshing engagement with ring gear 76 and sun gear 78. Carrier 80 is connected to torque transfer sleeve shaft 84, which is drivably connected to ring gear 34 of gear unit 28 and to ring gear 42 of gear unit 30. An overrunning brake 86 which has an outer race 88 grounded to the transmission housing as shown at 90 is adapted to anchor sun gear 44 during operation in each of the first four overdriving ratios, thus providing a torque reaction point for the gear system. Ring gear 54 is permanently anchored to the housing as shown at 92, thus permitting the final drive gear unit 52 to multiply the torque delivered through the gear units 74, 28 and 30 in each of the driving ratios.

A friction brake band 94 surrounds brake drum 96 which, in turn, is connected to sun gear 44. It is applied to anchor the sun gear 44 during hill braking operation and during reverse-drive operation.

A disc brake shown generally at 98 is adapted to anchor the carrier 38 against the transmission housing during operation in the lowest ratio and in reverse drive. Sun gear 36 is a torque input element flow transmission. During operation in reverse drive, sun gear 36 is connected to driven sprocket 100 by means of reverse clutch 102, the latter acting as a driving connection between the driven sprocket 100 and brake drum 104. Sun gear 36 is connected directly to the brake drum 104. Driven sprocket 100 is connected to driving sprocket 18 through a torque transfer drive chain 106. During forward drive operation, drive sprocket 100 is connected to sun gear 78 by forward drive clutch 106. This clutch is engaged during operation in the first three forward-driving ratios.

A direct-drive clutch 108 connects ring gear 76 with the driven sprocket 100 during operation in the third and fourth forward driving ratios as well as during the fifth driving ratio. When direct drive clutch 108 and the forward clutch 106 are engaged simultaneously, ring gear 76 is connected to sun gear 78 so that the elements of the gear unit 74 rotate in unison with a one-to-one speed ratio.

To effect a fifth forward-driving ratio, friction clutch 108 is applied, thus establishing a driving connection between sleeve shaft 84 and sun gear 44 of gear unit 30. This locks sun gear 44 to ring gear 42 so that the speed ratio developed by gear unit 30 is unity.

The neutral idle feature of our invention is achieved by controlling engagement and release forward clutch 106. When the vehicle is at a standstill and the engine is idling, the engine 10 will tend to drive the turbine because of the hydrokinetic torque multiplication effect of the converter 10. Thus, a driving torque will be delivered to the traction wheels through the gearing, even when the engine is idling.

In prior art designs, it is necessary to maintain the throttle at a sufficiently advanced position so that the engine will idle at a speed that will avoid undue engine harshness. It further is necessary for the vehicle operator to maintain his foot on the vehicle brake to avoid creeping of the vehicle with the engine idling. By disengaging the clutch 106 to establish a neutral idle condition, the torque flow path to the traction wheel is interrupted when the engine is idling with the vehicle at a standstill.

Figures 2, 3:
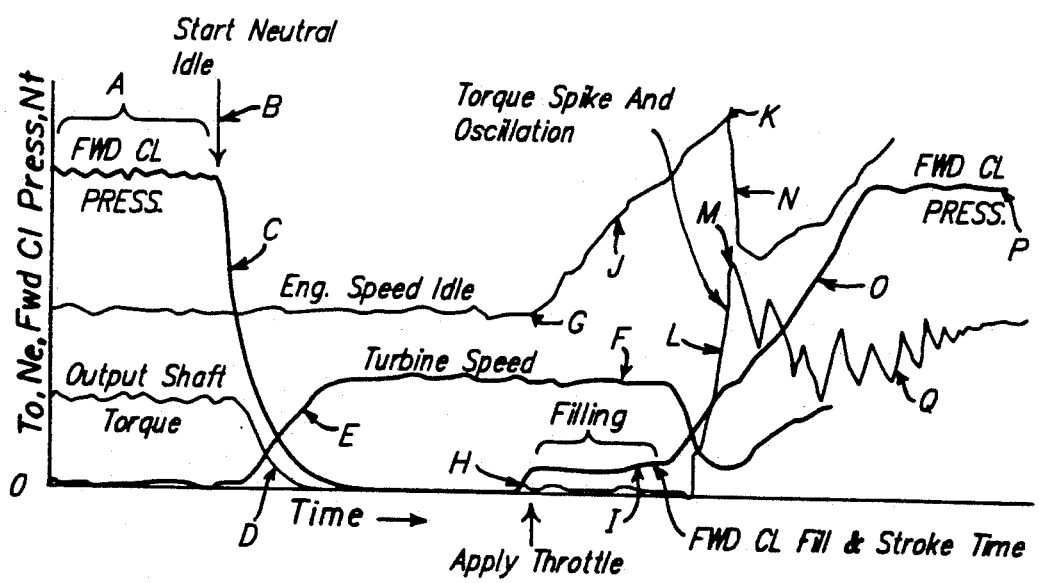
FIG. 2 is a chart that shows a clutch and brake engagement and release pattern for the transmission shown in FIG. 1 whereby automatic ratio changes are made.
FIG. 3 is a graph that shows output torque and clutch pressure changes as well as the engine speed and turbine speed changes during a neutral idle condition and during a subsequent engagement of the forward clutch for a typical transmission of the kind shown in the prior art references described in the preceding section.

Shown in FIG. 2 is a chart that indicates the clutches and the brakes that are applied and released to establish each of the five forward-driving ratios as well as the reverse ratio. The sun gear 36 is anchored by a second and fourth ratio brake band 110. That brake band is applied also during fifth ratio operation so that sun gear 36 may act as a reaction point as the ring gear 34 is overdriven and as torque is delivered to the gear unit 28 through the carrier 38 and through the direct-drive clutch 108. In the chart of FIG. 2, the forward-drive clutch 102 is designated as clutch FWD, the direct-drive clutch 108 is designated as clutch DIR, the reverse disc brake 98 is referred to as the LO/REV brake, the fifth ratio clutch 108 is identified as 5CL clutch, and brake band 110 is identified as 2/4 band.

First ratio drive is achieved by engaging brake band 94, which anchors sun gear 44. Also, disc brake 98 is applied, and reverse clutch 102 is applied. Thus, sun gear 36 is connected to the driven sprocket at 100, and the reverse motion imparted to the ring gear 34 is transferred to the ring gear 42 of gear unit 30. In the chart of FIG. 2, brake band 94 is referred to as the HB and REV band. The reverse clutch 102 is identified in FIG. 2 as the REV clutch.

Shown in FIG. 21 is a partial view of a control valve circuit capable of controlling the engagement and release of the servos that operate the clutches and brakes for the transmission illustrated in FIG. 1. only those portions of the valve circuit that have a direct effect on the operation of the forward clutch during the neutral idle operating mode will be described in detail.

Line pressure from a main regulator valve is supplied to the valve circuit through line 112. An engine-driven positive displacement pump is used as a control pressure source. It is regulated by a main regulator valve (not shown).

Control pressure is distributed to a 1-2 shift valve 114 which comprises a valve spool having two positions. When the transmission is conditioned for low-speed ratio operation, the valve spool is shifted in a right-hand direction under the influence of valve spring 116.

The valve spool for valve 114 comprises spaced lands 118 and 120. When the valve is moved to the right as shown in FIG. 21, passage 122 will be connected to passage 124 which is exhausted through the manual valve 126. When the transmission is conditioned for second-ratio operation, the 1-2 shift valve spool will be shifted in a left-hand direction because of a pressure force established by a signal pressure in line 128. That signal pressure is obtained from line 130 extending from a forward and reverse engagement valve 132. Line pressure is distributed from the line pressure passage 112 through passage 134; and when the forward and reverse engagement valve 132 is moved in a right-hand direction, passage 130 is brought into communication with pressurized passage 134.

In the neutral-idle operating mode, a 2-3 shift valve, shown at 136, is moved in a left-hand direction by the same shift signal in passage 128 that was described with reference to the 1-2 shift valve.

The regulated circuit pressure in passage 112 is distributed through the 1-2 shift valve to passage 122 and to a 1-3-1 shift valve 138 which is moved in a left-hand direction during operation in the neutral idle mode. Thus, the pressure in passage 122 will be distributed directly through the 1-3-1 shift valve to the low and reverse servo 140 through passage 142. The low and reverse servo operates the low and reverse brake 98.

During operation in the neutral idle mode, 4-3 shift valve 144 is shifted in a left-hand direction against the opposing force of valve spring 146. This shifting movement is achieved by the pressure in passage 148, which is the same pressure that actuates the 1-2 shift valve and the 2-3 shift valve. Communication between passage 148 and passage 128 is established by a two-way check valve 150.

The forward and reverse engagement valve, as mentioned previously, is shifted in a right-hand direction during operation in the neutral idle condition. This causes line pressure to be distributed directly from line 134 to line 130, which in turn supplies line 128 with line pressure through two-way check valve 152.

The 3-4 shift valve 154 is shifted in a left-hand direction during operation in a neutral idle condition. It assumes that position under the influence of valve spring 156. This line pressure is distributed to passage 158 from passage 160, the latter communicating with line pressure supply passage 122 through a two-way check valve 162.

Passage 158 communicates with passage 164 through 2-4-2 shift valve identified generally by reference numeral 166. It assumes that left-hand position under the influence of valve spring 168. Thus, passage 158 is brought into communication with passage 164 which supplies the band release side of the servo for the 2-4 band illustrated schematically in FIG. 1. That servo is illustrated schematically in FIG. 21 by reference numeral 170.

A variable-force solenoid shown in FIG. 21 at 172 controls the operation of a regulator valve spool 174, which is used in the neutral idle mode. Valve spool 172 comprises spaced regulator valve lands 176 and 178 which establish controlled communication between line pressure passage 180 and passage 182, which distributes forward clutch control pressure. Spool 174 is biased in a right-hand direction by valve spring 184. It is biased in a left-hand direction by a control pressure made available to orifice 186 by the variable-force solenoid 172. By varying the voltage on the variable-force solenoid, the degree of communication between orifice 186 and exhaust port 188 can be controlled. This, in turn, results in a variable pressure in passage 182.

As previously mentioned, the forward and reverse engagement valve 132 is in a right-hand position during operation of the transmission in the neutral idle condition. Thus, passage 182 is brought into communication with passage 190, which in turn communicates with passage 192 through the manual valve 126. The manual valve, when it assumes the so-called D1 position indicated in FIG. 2, will establish communication between passages 190 and 192 through the space provided by manual valve lands 196 and 198.

When the manual valve is positioned in the D1 position, the automatic transmission will be capable of sequentially establishing each o five forward driving ratios. When it is moved to either the D2 position or the L position, a fewer number of ratios are available, but that feature will not be described since it is not relevant to the present invention. The manual valve is under the control of the vehicle operator.

The 2-3 shift valve 136 moves in a left-hand direction when the transmission is in the neutral idle condition. It is shifted in that direction by the signal in passage 128 which controls, among other things, the position of the 1-2 shift valve as mentioned earlier. When the 2-3 shift valve moves in a left-hand direction, communication is established between passage 192 and passage 200 through the 2-3 shift valve by reason of the space established by 2-3 shift valve lands 202 and 204.

Thus, during operation in the neutral idle condition, passage 200 is brought into communication with passage 202 through the 4-3 shift valve. That valve assumes a left-hand position during operation in the neutral idle condition since it is biased in that direction by the pressure in passage 148 as previously described. Passage 202 thus is brought into communication with passage 200 in the neutral idle condition. Pressure then is distributed through passage 202 to the 2-4-2 shift valve, the latter assuming a left-hand position during operation in the neutral idle mode. Thus, passage 202 communicates with passage 204 through the space provided by lands 206 and 208 on the valve spool 166. Passage 204, in turn, communicates with passage 210 through the 1-3-1 shift valve, which is shifted to the left-hand position by valve spring 212. Communication between passages 204 and 210 is established by the space between valve lands 214 and 216 on the 1-3-1 shift valve spool. Passage 210 supplies the forward clutch servo 218 with a pressure that is under the control of the variable force solenoid 172. The servo that controls the operation of the reverse brake band 94 (see FIG. 1) is shown at 220 (see FIG. 21), and the piston for controlling the direct drive clutch 108 (see FIG. 1) is shown at 142 (see FIG. 21). The servos and the description of the fluid circuit that supplies pressure to them will not be described because they do not directly affect the neutral idle feature that is the subject of this invention.

Three on-off solenoids (not shown) are pressurized by passage 112. These solenoids actuate valves which control distribution of a signal pressure to each of the shift valves to cause them to move against their respective valve springs. These signal passages are identified generally in FIG. 22 by reference numerals 222, 224 and 226.

Figure 10:
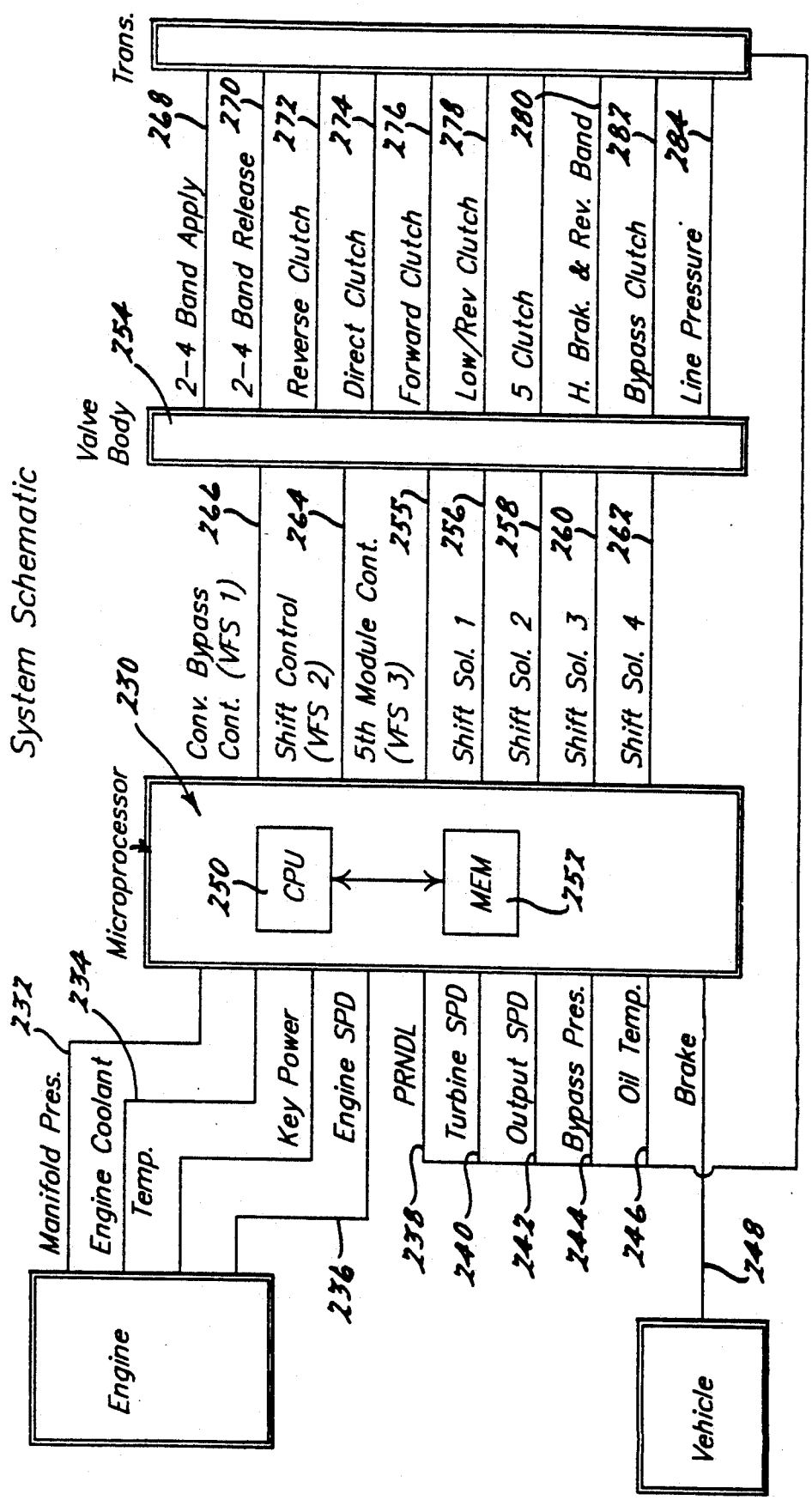
FIG. 10 is a schematic representation of the control system including the electronic microprocessor for controlling clutch engagement in a closed-loop fashion.

Shown in FIG. 10 is a schematic representation of the microprocessor control system for controlling the operation of the variable-force solenoid indicated generally at 172 in FIG. 10. The engine is generally designated by reference numeral 228. Operating variables for the engine, such as manifold pressure and coolant temperature and engine speed, are measured by analog sensors and distributed to an electronic microprocessor 230. The signal passage for manifold pressure is shown at 232. The engine coolant temperature signal is distributed to the processor 230 through signal line 234. The engine speed signal is distributed to the processor 230 through line 236.

Other variables that are measured and distributed to the processor are a signal indicating the range selection or transmission manual valve position. This signal is distributed through signal passage 238. Turbine speed also is measured, and that value is distributed to the processor through signal line 240. The torque output shaft speed for the transmission is distributed to the processor through signal line 242. A bypass clutch pressure signal is distributed to the processor through signal line 244, but that signal is irrelevant to the present invention. Transmission oil temperature for the engine is measured, and the signal representing that value is distributed to the processor through signal line 246. A brake signal is distributed to the processor through signal line 248. The presence of a signal at line 248 will indicate whether the vehicle brakes are applied or released by the vehicle operator.

The processor 230 will receive the information developed by the sensors and condition it so that it may be used in digital form by the central processor unit. The central processor unit identified at 250 processes the information delivered to the processor 230 in a manner that will be described subsequently using algorithms that are stored in memory 252. The output signals from the processor 230 are delivered to the valve body 254, which was described generally with reference to FIG. 21.

The output data includes shift signals delivered to the shift solenoids which control the ratio changes. These solenoid signals are identified by reference numerals 256, 258, 260 and 262 in Figure 10. The variable-force solenoid 172 receives a signal identified by numeral 264 in FIG. 10. A converter bypass clutch solenoid, which is a variable-force solenoid (VFST), receives a signal identified in FIG. 10 by reference numeral 266. The variable force solenoid (VFS2) that is significant with respect to the present invention receives a variable-force solenoid signal at 264 in FIG. 10. Variable force solenoid No. 3 (VFS3), shown at 255 in FIG. 10, controls the operation of the fifth speed and is irrelevant to this disclosure.

The output signal developed by the valve body 254 controls the operation of the clutches and brakes of the transmission illustrated in FIG. 1. The signal for controlling the 2-4 band apply is identified by reference numeral 268. The release signal for the 2-4 band is identified in FIG. 10 by reference numeral 270. The reverse clutch pressure is identified by the numeral 272. The direct clutch pressure is identified by numeral 274. The forward clutch pressure is identified by numeral 276. The low and reverse clutch pressure is identified by numeral 278. The hill brake and reverse band pressure is identified by numeral 280. The bypass clutch pressure is identified by numeral 282. The line pressure, which is fixed in drive and boosted in reverse, is identified in FIG. 10 by numeral 284. The only element of the transmission that is of significance with respect to the neutral idle control of the present invention is the forward clutch 276.

For purposes of describing the benefits of our invention, a comparison to neutral idle features presently known in the prior art reference first will be made with reference to FIG. 3, which shows neutral idle clutch characteristics for a transmission having an open loop-type converter such as those described with reference to the prior art references discussed in the preceding portions of this specifications. In FIG. 3, time is plotted on the abscissa; and output shaft torque, clutch fluid pressure, engine speed and turbine speed are plotted on the ordinate. The forward clutch pressure, the engine speed, the turbine speed and the output shaft torque assume initially the values shown in region A of FIG. 3.

It is seen from FIG. 3 that the turbine speed is zero since the vehicle is at rest. The difference between engine speed and turbine speed represents the slip that exists when the vehicle comes to rest and before the neutral idle mode begins. At time B, the neutral idle mode is initiated, which results in an exhaust of pressure from the forward clutch. This results in a decay of the forward clutch pressure over a short period of time, as indicated by the curve C in FIG. 3. The output shaft torque decays, as shown by curve D, as the forward clutch pressure is relieved.

As the forward clutch looses capacity following initiation of a neutral start mode, the turbine speed will increase, as shown at E, until it reaches the normal turbine speed for engine idle, which may be 600 rpm as shown at F in FIG. 3. The engine speed at that time in a typical vehicle installation may be about 800 rpm as shown at G.

At the termination of the neutral idle mode, in the prior art design is illustrated in FIG. 3, the operator will advance the throttle at point H. An immediate increase in the forward clutch pressure then will occur until a transition pressure indicated at I is reached. It is during this interval that the clutch servo cylinder is filling and the clutch servo piston is stroking.

Because the engine throttle is advanced, the engine speed will respond to the advancing throttle and will increase as shown by the ramp J in FIG. 3.

The engine speed continues to increase until the clutch servo is fully stroked. At that time, the engine speed will have reached a peak value shown at K.

When the piston for the forward clutch servo is stroked and the forward clutch gains capacity, the output shaft torque will sharply rise, as indicated by the steep slope curved portion L, until it reaches a peak value shown at M. The achievement of the peak value M is coincident generally with the peak engine speed, the latter immediately decreasing in value at a fast rate, as shown at N. The decreasing engine speed is accompanied by a substantial inertia torque which contributes to the achievement of the peak value M for the output shaft torque. The clutch pressure will continue to increase following the stroking of the clutch servo piston and progressively increase at a rapid rate, as shown by the curve 0, until a final clutch pressure value is reached, as shown at P.

The output shaft torque will be subjected to torque fluctuations, as demonstrated by the oscillating torque values Q following clutch engagement.

The torque curve illustrated in FIG. 3 is perceptible as a "slip bump" disturbance which occurs following the advancement of the engine throttle. The subsequent engine speed run-up and the output shaft torque spike and oscillation is unacceptable. The control strategy of our present invention which avoids these unacceptable features of prior art neutral idle control systems now will be explained with reference to FIGS. 4, 5, 6 and 7.

Figure 4:
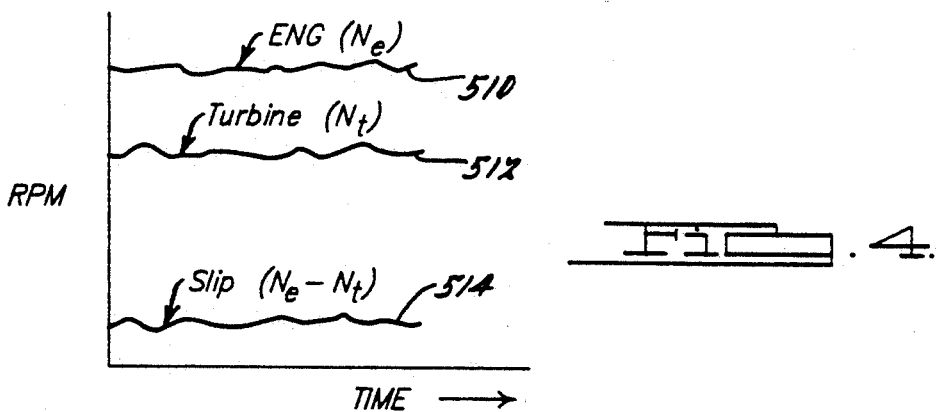
FIG. 4 is a chart showing the variation of engine speed, turbine speed and converter slip, measured in rpm, versus engagement time for the forward clutch.
Figure 5:
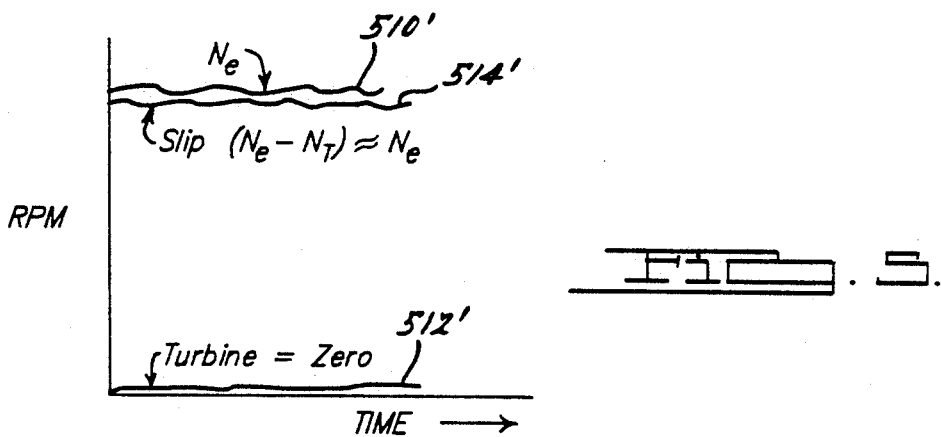
FIG. 5 is a chart similar to FIG. 4 showing the same variables illustrated in FIG. 4 after the forward clutch is fully engaged.
Figure 6:
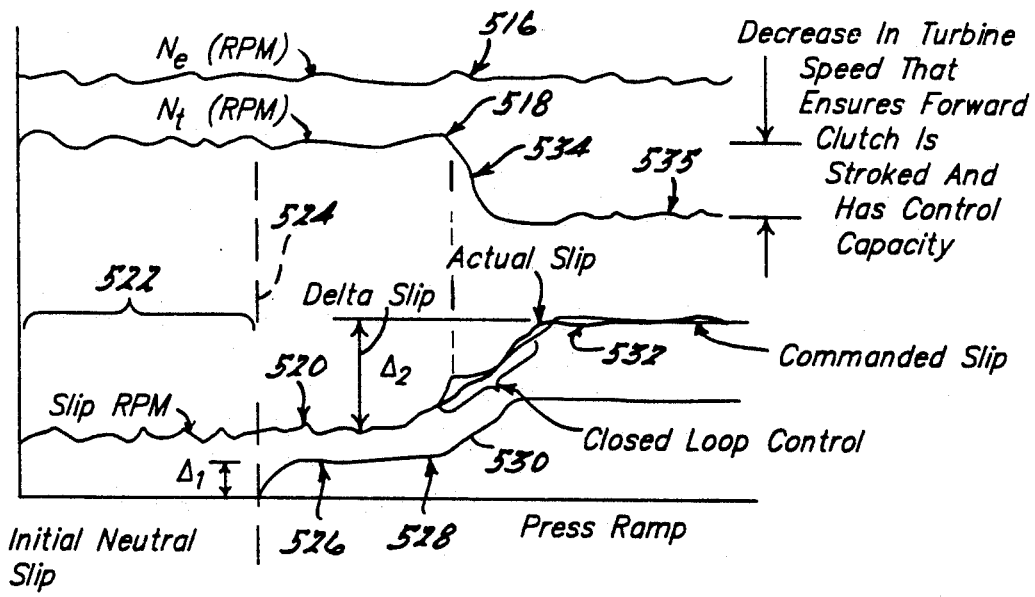
FIG. 6 shows the relationship between engagement time and turbine speed, engine speed and converter slip for our improved control system.

In FIG. 4, engine speed and turbine speed are plotted as shown at 510 and 512. The difference between engine speed and turbine speed is equal to slip, and this relationship is plotted against time on the abscissa as shown at 514. The speed value shown in FIG. 4 represents the engine speed, the turbine speed and the slip of the converter when the vehicle and the transmission are in the neutral condition prior to initiation of the neutral idle mode. FIG. 5 represents the same values after full engagement of the forward drive clutch. At that instant, the turbine speed is essentially zero, as shown at 512', and the slip value shown at 514' is essentially the same as engine speed as shown at 510'. When the manual valve shown at 126 in FIG. 22 is moved from the park or neutral position to the drive position $D_1$, the neutral idle control features will be changed as illustrated in FIG. 6 where the engine speed is represented at 516, the turbine speed is represented at 518, and the slip value is represented at 520. The speed values represented in zone 522 of FIG. 6 are the same essentially as the speed values described with reference to FIG. 4.

The neutral idle mode begins at time 524 in FIG. 6. Immediately, the clutch pressure will increase to a value $\Delta_1$, as shown at 526. The clutch servo piston will begin to stroke under the influence of the pressure $\Delta_1$ until the friction surfaces of the clutch are engaged. At that time, as indicated in FIG. 6 at 528, a closed-loop control pressure command ramp to establish slip control is initiated. At point 528, the control system will command from memory in the microprocessor portion of the control system a value for a ramp constant which will establish a ramp slope value for the clutch pressure. The clutch pressure will increase following the fetching of the command signal from the processor memory until a value is reached, as shown at 530, which is sufficient to maintain the increased value of commanded slip and to ensure that the forward clutch is stroked and has control capacity. Beginning at the commanding of the slip value, the microprocessor will continuously monitor the engine speed and the turbine speed and will calculate the actual slip. The actual and the commanded slip is shown at 532. The increased slip shown at 532 is the result of the decreased turbine speed shown at 535. The actual slip generally will follow the commanded slip curve; but when deviations occur between the actual slip and the commanded slip, a control error results. The amount of this error will cause the closed loop control system to respond and to make appropriate adjustments in forward clutch pressure so that the commanded slip and the actual slip will generally be consistent, one with respect to the other.

Shown in FIG. 6 at 534 is the actual value of the turbine speed. The turbine speed decreases during the ramping of the clutch pressure in accordance with the commanded slip control strategy until a steady state value shown at 535 is reached. During clutch engagement prior to the commanding of the closed-loop control ramp, the turbine speed, as shown at 518, is slightly less than the engine speed, as shown at 516. That is due to the pressure designated as $\Delta_1$ in FIG. 6 in the clutch servo. This $\Delta_1$ pressure assures that the forward clutch is stroking at minimum capacity, and that the clutch has stroked prior to the execution of the pressure ramp at 528. The increase in slip, shown as A in FIG. 6, ensures that the clutch has control capacity to immediately deliver torque to the driven shaft upon advancement of the engine throttle.

The increase in the actual slip is continuously monitored by the control system after the forward clutch has sufficient capacity. The measured slip is sensed and stored in the memory portion of the microprocessor 230 for each control loop of the microprocessor. By commanding an increase in the value of the slip and controlling that value by means of a closed-loop controller, the forward clutch is filled and stroked and is ready to be fully applied when the throttle is advanced by the driver. If the $\Delta_2$ slip command is in the range of 200 rpm, for example, the forward clutch will be lightly applied and there will be a minimal output shaft torque. Thus, there is an improvement in the fuel economy of the engine because of the neutral idle condition.

Figure 7:
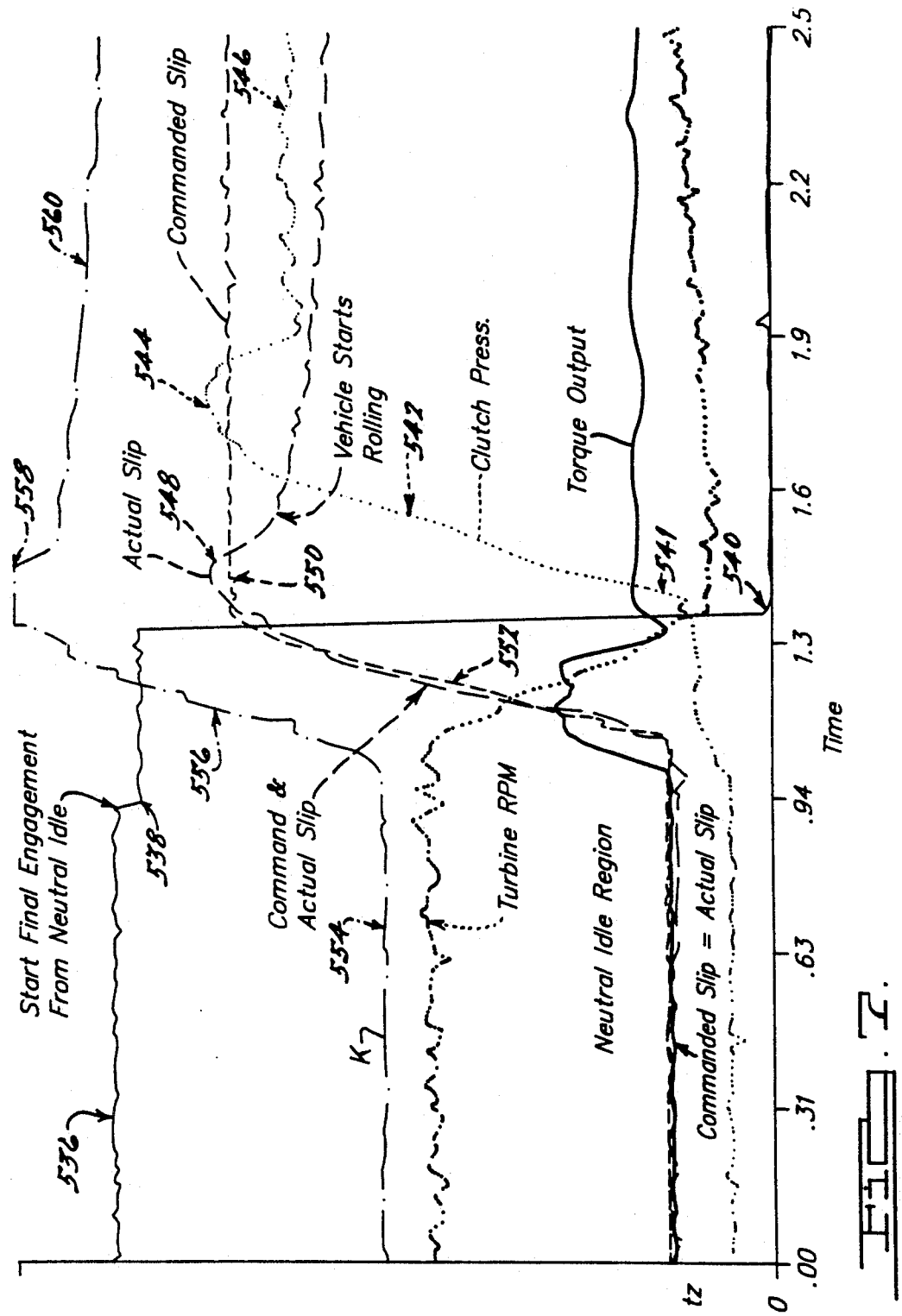
FIG. 7 is a graph, showing the neutral idle concept, which is a plot of the turbine speed, the engine speed and the converter slip versus time.
Figure 8:
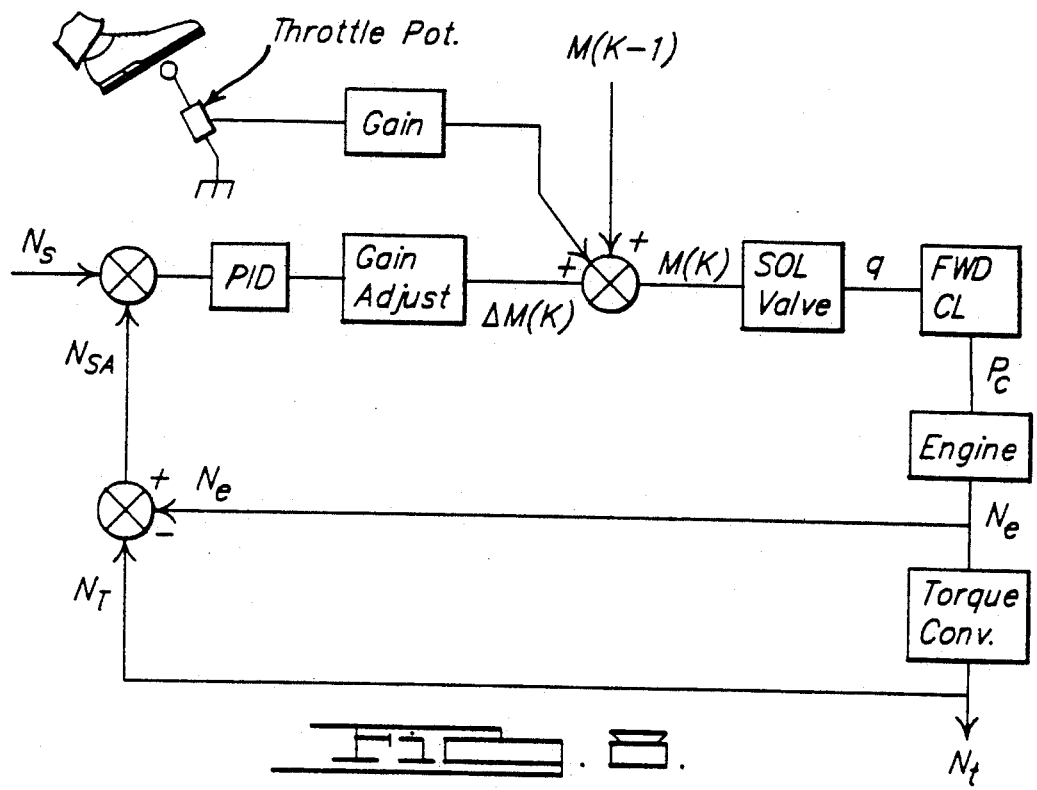
FIG. 8 is a chart showing a closed-loop circuit for engaging the forward clutch during the neutral idle slip operating mode.

FIG. 7 shows full engagement from the neutral idle condition. The neutral idle procedure could be used to fully engage the forward clutch when certain conditions exist, such as removal of the driver's foot from the brake, as will be explained subsequently.

The data in FIG. 7 is actual test data for an automotive engine. It shows at 536 a plot of the current for the variable-force solenoid 172 of Figure 21. At point 538 of FIG. 7, the current for the variable-force solenoid is decreased an incremental value indicating the start of the full engagement mode. This is the engagement preparation phase. The solenoid is a normally open solenoid wherein maximum current is required to establish maximum solenoid signal pressure. When the current is reduced to zero at point 540 in FIG. 7, closed-loop engagement is completed and the clutch is fully engaged. Following engagement, the clutch pressure increases as shown at 542 until it reaches a peak value at 544. A stabilized clutch pressure is indicated at 546, at which time the clutch is fully engaged.

The actual slip value that is monitored by the engine speed sensor and the turbine speed sensor is shown at 548. This compares to the commanded slip value as shown at 550. During the closed-loop engagement phase, the commanded slip and the actual slip are generally in conformity as shown at 552.

A plot of the torque converter size factor or torque capacity factor K is shown at 554. Size factor K for the torque converter 10 is equal to engine speed divided by the square root of engine torque. The size factor K increases sharply as shown at 556 until a maximum value is reached at 558 as the engine throttle is advanced. The size factor will assume a stabilized value as shown at 560 when the torque converter achieves its coupling range, at which time the torque converter no longer multiplies torque hydrokinetically. The value for the K factor as shown at 554 can be used as a substitute for the sensed slip values that are stored in memory rather than appropriate slip values that are present in the data registers of the ROM portion of the memory of the microprocessor.

The torque converter size factor can be used instead as a control parameter during the closed-loop engagement mode for the forward clutch. In that instance, the microprocessor will continuously monitor engine torque and impeller speed and determine size factor value during each background value, and that value is stored in temporary memory. It then is fetched and compared to a value for size factor representing the optimum value for desired clutch engagement for a particular engine torque and engine speed.

The conditions that are necessary to initiate the neutral mode include movement of the manual valve from the park or neutral position to the D1 position. This can be sensed by a position sensor. The driver also must apply the brakes in order to create a brake signal which is delivered to the microprocessor. Further, the engine speed must be less than the idle speed plus a calibrated value such as 200 rpm. Further, the vehicle speed must be less than a calibratable value such as 2 mph. Further, the vehicle speed must have previously increased to a value greater than 10 mph after the first execution of the neutral idle strategy (see FIGS. 11 and 12).

The neutral idle will be executed only if the vehicle brakes are applied, as mentioned earlier. When the driver lifts his foot from the brakes and begins to advance the engine throttle, a full closed-loop forward clutch engagement mode will be executed. This allows the time to fully pressurize the clutch prior to advancing the throttle. If the driver has his foot on the brake but also is applying the throttle simultaneously, and the engine speed is greater than idle speed plus 200 rpm, a full forward clutch closed-loop lockup mode will be executed and the neutral idle mode will be canceled.

If the vehicle speed is less than about 2 mph, neutral idle is prevented while the vehicle is moving but the brake has been applied.

If the vehicle speed previously has increased to a value greater than 10 mph, the so-called neutral idle "busyness" will be avoided.

If the driver has shifted the manual lever to the D1 position with his foot on the brake, for example, the conditions are satisfied and neutral idle will be executed. If the driver is in stop-and-go traffic, however, and he continues to lift his foot from the brake and apply the throttle, cycles from and to the neutral idle mode is not desirable. It is not desired to establish a full lock-up each time those conditions are met. To prevent this, the vehicle speed or, as an alternative, an alternate gear ratio, must exceed a calibratable value before the neutral idle can be re-executed. This also minimizes disturbances in torque on parking ramp stop-and-go conditions.

FIG. 20 shows the closed-loop controller which controls the slip (i.e., engine speed minus turbine speed) to an increased value from the full neutral slip. This assures that the forward clutch is pressurized and is capable of controlling the requested slip. In addition, the closed-loop aspects of the controller will eliminate the effects of spring tolerances, clutch wear, hydraulic oil temperature variations and other aspects of aging. If the throttle is advanced, a feed forward gain circuit is activated to quickly allow clutch lockup without having to wait for the controller to calculate a speed error. The feed forward input from the throttle position sensor provides an input to the neutral idle control solenoid that will ensure rapid forward clutch lockup when the foot is removed from the brake and the throttle is rapidly depressed.

The schematic circuit diagram for the neutral idle slip controller is shown in FIG. 20. The slip value is calculated by a comparator 300. The engine speed signal is delivered through a low-pass filter 302 from a signal line 304. A turbine speed signal is delivered through sensor line 306 through low-pass filter 308. These two values are compared at 300 to determine a slip value in line 320, which is delivered through low-pass filter 322 to a comparator 324. If the speed measurement is low, a low-pass filter is needed because it will eliminate signal noise, thus making it possible to achieve a useful speed signal. The same is true for low turbine speed values. The resultant slip signal delivered to comparator 324 is filtered again by circuit 322 independently of the functions of the low-pass filters 302 and 318.

The commanded slip Ns that is fetched from memory in the processor is delivered through low-pass filter 326 to the comparator 324. A proportional integral derivative (PID) gain control algorithm circuit 328 receives the actual slip value and commanded slip value difference determined by the comparator 324. That value is magnified by an overall gain factor $K_c$ at 330. The output of circuit 330 is received by a summer 332. The output of that summer is converted to a signal pressure by a transducer 334, the output of which is a current for the variable-force solenoid 172.

The feed forward circuit previously described, which permits the neutral idle mode to be interrupted if the operator should advance the throttle early, is indicated generally at 336. The output of that feed-forward circuit is distributed to the summer 332 and adds a sufficient increment to permit rapid advancement of the output of the variable-force solenoid to cause early full engagement of the clutch.

In FIG. 20, the symbols indicated in the closed-loop diagram correspond to the following values:

$N_s$ = commanded slip
$N_{sa}$ actual slip ($N_e - N_t$)
$N_e$ = engine speed
$N_t$ = turbine speed
PID = proportional integral differential incremental controller $\Delta m(k)$ incremental duty cycle percent M (K−1) = past duty cycle percent M (K) = present duty cycle percent
q = solenoid valve flow cubic inches per second
$P_c$ = forward clutch pressure In the diagram of FIG. 20, the past duty cycle is summed with the present duty cycle, as indicated. If there is a difference, a change in the solenoid valve flow q is indicated in order to establish a new clutch pressure $P_c$ which will bring the slip value to that value that is dictated by the commanded slip. The duty cycle in the past loop for the processor is stored in temporary memory RAM registers so that it can be fetched from memory and delivered to the CPU of the processor during the current duty cycle where it can be compared with the current duty cycle.

It is seen from the foregoing that the main principle that is used to implement the neutral idle concept involves increasing the converter slip a computed amount from the full neutral value in order to assure that the forward clutch always will be stroked and pressurized and is ready to transmit torque upon advancement of the engine throttle by the driver. The converter slip is the main control value.

In an alternative arrangement, it is possible to use the converter characteristics rather than the slip as the control variable. For this purpose, reference will now be made to FIG. 9 where the converter speed ratio $N_t$ divided by $N_e$ is plotted against torque ratio. At zero speed ratio, the torque multiplication of the converter is a maximum. It decreases as shown by the characteristic curve 340. When the coupling point is reached at a speed ratio of unity as shown at 342, the torque converter enters the coupling range.

If the transmission is in neutral and the torque converter is unloaded, the speed ratio will be in a range between about 0.8 and 1.0, as indicated at 344. When the forward clutch is pressurized, the turbine speed will start to decrease as does the converter slip. At a speed ratio of about 0.8, the torque converter will start to amplify input torque, as evidenced by the increase in torque ratio indicated at 340. Thus, instead of using converter slip as a control variable for the neutral idle, a Δ increase in torque ratio could be used as a criterium for obtaining and controlling neutral idle.

Figure 9:
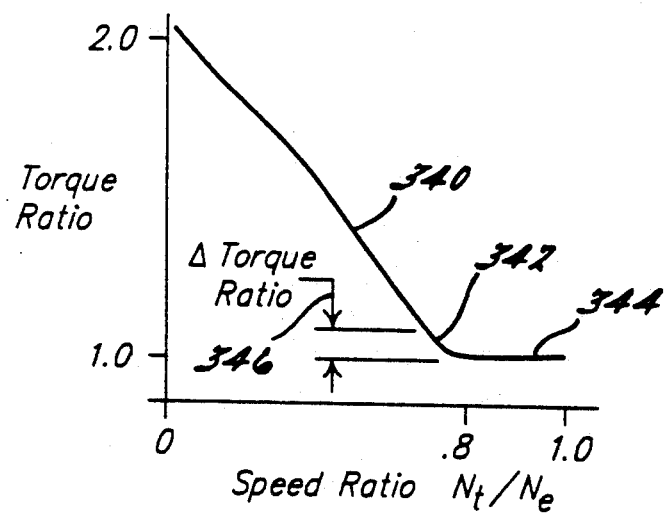
FIG. 9 is a chart showing an alternative set of variables for controlling the clutch engagement including the torque ratio and the speed ratio of the converter, and the relationship between those variables.

A Δ increase in torque ratio that can be sensed and used by the CPU of the processor is designated in FIG. 9 at 346. Full lock-up of the forward clutch may be commanded by the processor by commanding a controlled increase of torque ratio instead of slip. Further, as mentioned earlier with respect to the description of FIG. 7, the torque converter size factor K can be used as a control variable, as indicated at 554 in FIG. 7. The size factor, as mentioned earlier, is equal to engine speed divided by the square root of engine torque.

Figure 19:
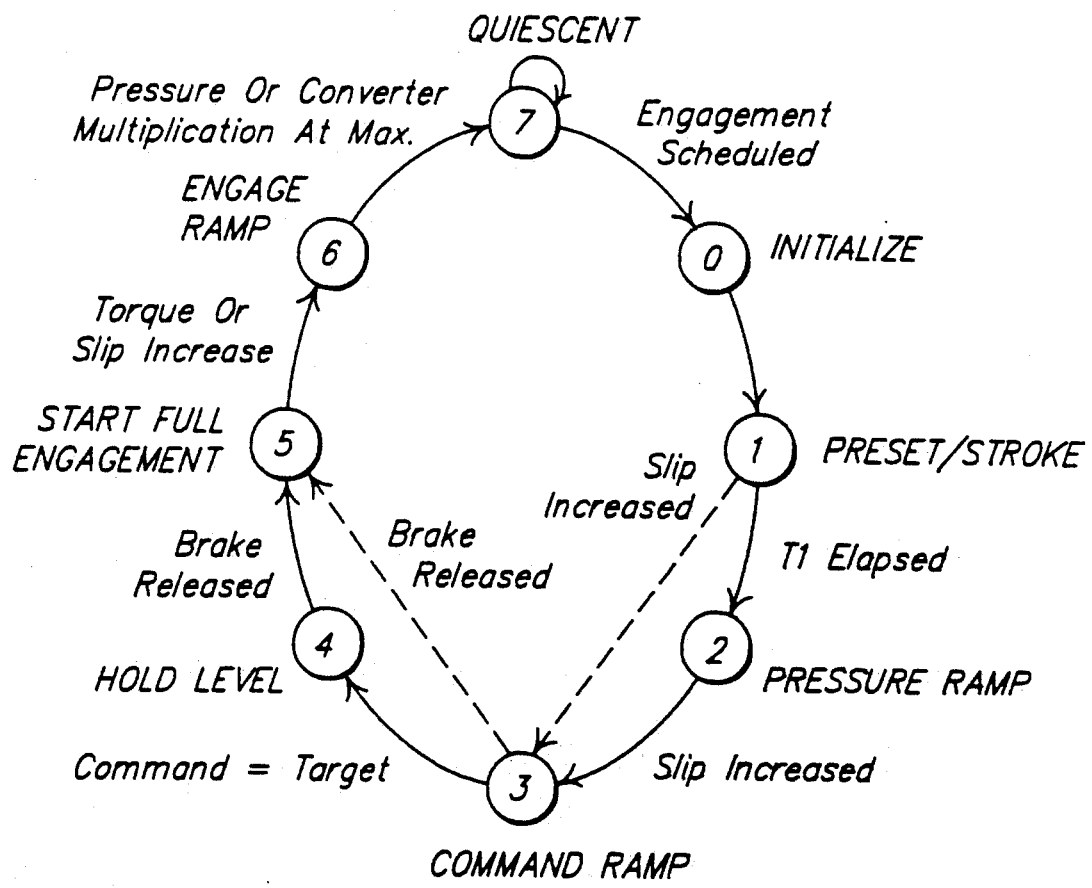
FIG. 19 is a chart showing the closed-loop engagement state transitions for the neutral idle controller.

FIG. 19 illustrates in graphic form the sequence in the operation of the instruction sets for the microprocessor. Each instruction set is carried out sequentially in each control loop. After initialization of the processor, the software is conditioned to execute the series of instructions at each of the interrupt points represented by the interrupt points 1-7. At interrupt point 1, the processor will execute the preset stroke routine. That occurs at a time indicated by reference numeral 1 in the plot of FIG. 18 which accompanies FIG. 19. After an elapse of a time indicated at $T_1$, the pressure is ramped up beginning at point 2. As the interrupt point 2 is reached, the pressure will increase, as indicated in FIG. 18, until the closed loop command interrupt 3 is reached. As the clutch is engaged, the slip indicated in FIG. 17 is increased.

If there is a slip detected by the controller due to advancement of the throttle or due to a downhill coast or some other temporary condition that might result in an increased slip, the pressure ramp 2 in FIG. 17 will be bypassed as indicated by the dotted line extending between interrupt point 1 and interrupt point 3 in FIG. 19.

After the command ramp interrupt point is reached in the control routine, a hold level closed-loop control is initiated. This hold level is represented in FIG. 7 at the left side of the point 541. The command slip is set at a target value at that time, and the slip is continuously monitored as previously described, so that the hold level pressure can be maintained, thus conditioning the clutch for immediate transition to the torque delivery stage. If the brake is released prematurely, following the commanding of a target slip, and the control routine of FIG. 19 from stage 3 to stage 5 has not had sufficient time to be completed, the routine will bypass the hold level interrupt point and proceed directly as indicated by the dotted line of FIG. 19 to start full-clutch engagement. This occurs at interrupt point 5. As indicated in the graph of FIG. 18, this will result in immediate increase in the forward clutch pressure as the engagement ramp takes place. This is accompanied by a torque or slip increase as the routine proceeds through the engagement ramp interrupt point 6. This control also is a closed-loop control, as indicated in the graph of FIG. 18. After the closed-loop control is completed, the control enters a quiescent stage as indicated at point 7, and the controller routine then is complete.

FIG. 11 shows the control strategy software routine for inhibiting neutral idle when the conditions are not proper for neutral idle. At the start of the routine, at 640, the measurement is made by a clock timer circuit in the microprocessor to determine the time since the start of operation of the vehicle driveline. If the time is greater than some value, it will be assumed that the temperature is of a sufficient value to permit the control routine to continue. This inquiry with respect to the time elapsed is indicated in the FIG. 11 at 642. Actually, the inquiry concerns the level of the hydraulic fluid temperature, and the time measurement is simply a means for determining the temperature level. In the alternative, hydraulic fluid temperature can be measured directly.

The routine then proceeds to step 644 where a vehicle speed value is fetched from temporary storage in the processor memory and is compared to some calibrated value stored in ROM. If the measured speed value is greater than that stored value, the routine then can proceed as indicated in FIG. 11 to allow the neutral idle mode to be initiated, as shown at 646. On the other hand, if the speed is too low, the resulting positive inquiry at 644 will cause the routine to proceed to step 648 where an inquiry is made to determine if the gear ratio of the transmission is greater than the lowest ratio or some other calibrated gear ratio. In most instances, the low gear ratio will be the low ratio determined by the hydraulic control system when the manual valve is moved to the hill 1 position previously described.

If the inquiry at 648 is negative, the routine then will continue to step 646 where the memory is cleared. On the other hand, if the result of the inquiry is positive, the routine will proceed to step 650 where the memory is set and neutral idle is allowed.

The memory can be set to allow neutral idle also on initial engine start-up.

FIG. 12 shows a routine similar to the
ne of FIG. 11, although it illustrates the conditions that will permit the neutral idle state to occur rather than inhibiting neutral idle. The routine will start at step 652 shown in FIG. 12 and then proceed to step 654 where an inquiry is made to determine whether the manual valve is in the D1 position. If the answer is negative, the neutral idle is disabled as indicated at step 656. If the answer is positive, an inquiry is made at step 658 to determine whether the brake is applied. If it is not applied, again the neutral idle mode is disabled, as shown at 656. If the brake is applied, a speed measurement is made at step 660 to determine whether the vehicle speed is less than a minimum value, such as 2 mph for example. If it is moving at a speed greater than the minimum value, which is stored in ROM, again the neutral idle mode will be disabled, as indicated at step 656. If the speed is less than the minimum value, the measurement is made in the next step 662 to determine whether the engine rpm is less than idle speed plus some incremental value of speed. A typical engine rpm value that will permit the routine to continue might be about 800 rpm in a typical automotive vehicle driveline. If the speed is not less than the required minimum, again the routine is disabled as shown at 656.

At step 664, a test is made to determine whether there have been repeated lockups of the clutch within a prescribed time, which would indicate an abnormal condition when neutral idle would not be appropriate. If that is the case, the memory is cleared and the neutral idle condition is disabled, as shown at 656. If the test at 664 is met, the routine then will proceed to the neutral idle enable mode at 666.

If stage 666 is reached, the neutral idle state transitions from one interrupt point to the other in the control loop will take place as indicated in FIGS. 13, 14, 15 and 16. The quiescent state 668 in FIG. 13 corresponds to the interrupt point 7 in FIG. 19. If that state is called for, the control routine dealing with neutral idle need not take place, and the processor then will immediately proceed to stage 670, as shown in FIG. 16. This is a so-called "do nothing" control path.

The initialized interrupt point occurs at stage 670. The initializing routine involves the fetching from memory at step 672 of the initial slip from the storage area in RAM memory. That is followed by a clearing of the counters at 674 and a clearing of the timers at 676 as the solenoid pattern is conditioned for engagement at 678.

The initial clutch pressure, which is a stored value in memory, is called out by the processor at step 680. The initializing stage then is done as indicated at 670 in FIG. 13.

The routine then proceeds to the interrupt point 1 of FIG. 19 as indicated by action block 682 in FIG. 13. That subroutine involves first a determination of whether the actual slip that is monitored by the sensors previously described is greater than an initial slip plus an incremental value of slip. This determination is made at step 684. if the slip is great enough, the routine will proceed directly to step 686 after recording the instance in a counter at step 688. If the slip increases as described with reference to the dotted line between points 1 and 3 of FIG. 19, a counter will be incremented at 688; and if it is set at a count greater than a predetermined limit at step 686, the command ramp interrupt routine will take place, as indicated at step 688 (stage 1 to stage 3, as shown in FIG. 19). If the inquiry at 684 is negative, the routine will record time spent in this state; and if it exceeds a calibratable value at step 692 of Figure 15, execution will proceed directly to pressure ramp interrupt stage 2 in FIG. 19.

When the routine proceeds to the command interrupt shown at 696, an increasing slip value is fetched from memory at step 698, as shown at Figure 13. That is followed by a closed-loop control at 700 wherein the processor receives engine speed and turbine speed data and determines whether the commanded slip corresponds to the actual slip. If the commanded slip equals the target slip in an inquiry taking place at 702, the state variable is set to the hold level, as shown at step 704. If it is not equal to the target slip, the clutch pressure is increased so that the commanded slip and the target slip will be brought into conformance. An inquiry then is made at step 706, and if the slip conditions are satisfied, the state variable is set to the start engagement routine at 708. A test then is made to determine whether the brake is released. This is done at 710. If it is released, the engagement routine may take place, as indicated at 712. If the brake is not released, the routine then will be interrupted and will proceed to the action block 670 in FIG. 16.

If the state variable indicated at step 694 is the pressure ramp stage, the routine will proceed to the pressure ramp routine which begins at step 714 in FIG. 14. The ramp pressure then is fetched at step 716 from memory, and an inquiry then is made at step 718 to determine whether the slip that exists at that time is greater than the initial slip plus an incremental value. If the inquiry is positive, the counter is incremented at 720. A test is made at 722 to determine whether the counter value following initiation of the command ramp is greater than a predetermined value. If the counter is at a value that will be sufficient to enable the command ramp to proceed, the routine will proceed to step 724 where the command ramp is begun. This involves a setting of a target slip at 726 which is equal to the initial slip plus an incremental value, as described previously with reference to FIG. 18.

If the hold level routine is called for at step 704 in FIG. 13, the subroutine 728 in FIG. 14 begins. This hold level involves a closed-loop control in accordance with the commanded slip which is indicated by action block 730 whereby the pressure of the clutch is maintained at an initial level sufficient level to pick up clutch tolerances and to permit incipient clutch engagement so that the clutch is ready for full engagement. A test then is made at step 732 to determine whether the brake is released; and if it is, the engagement routine may start as shown at action block 734. If the brake is not released, the routine ends as indicated at step 670 in FIG. 16.

If the state variable is set to the start engagement routine, which is designated by numeral 736 in FIG. 14, the pressure will be increased to some value fetched from ROM as indicated at step 737 in FIG. 14. An inquiry then will be made at 738 to determine whether the engine torque has been increased or the slip increased. If that has not happened, the routine then will end as indicated at 670 in FIG. 16. If it has occurred, the state variable is set to the engage ramp state as shown at action block 740.

The engage ramp routine, which begins at point 742 in FIG. 14, first requires a ramp command for slip to occur so that the slip is equal to engine speed. This occurs at action block 744. A closed loop control takes place then at action block 745 as the slip is commanded to increase in accordance with the increasing slope portion of the curve of Figure 18. This is a closed loop control as is the command ramp and the hold level routine indicated at an earlier time in FIG. 18. Again, the engine speed and the turbine speed will be monitored and the determination will be made following a calculation of slip to determine whether the actual slip is equal to engine speed. This occurs at 746. If the actual slip indeed is equal to engine speed, the neutral idle condition is terminated and the state variable is set to the quiescent state at step 748. The routine then returns to state 668, as shown in FIG. 13.

We contemplate that one of the input signals that would be delivered to the microprocessor 230 of FIG. 10 is a signal from an inclinometer which will measure whether the vehicle is on a slope while the vehicle is stopped with the engine in the idle condition. If the vehicle indeed is on a slope, the microprocessor will use that information to overrule the neutral idle software routines described with reference to FIGS. 19 and 20 and FIGS. 11-16. The inclinometer used to obtain the slope signal can be the same signal that is obtained for automatic vehicle suspension systems, presently used in the automobile industry so a separate sensor need not be required to incorporate this feature in the neutral idle control for the transmission.

Having described a preferred embodiment of our invention, what we claim and desire to secure by United States Letters Patent is:

1. A control system for an automatic transmission for a vehicle with driver controlled brakes, said transmission being adapted to deliver torque from a throttle controlled vehicle engine to vehicle traction wheels;

said transmission including a hydrokinetic unit having an impeller and a turbine in a toroidal fluid flow circuit, said impeller being connected to said engine, a torque input shaft adapted to be connected to said turbine, a torque output shaft adapted to be connected to said traction wheels and multiple ratio gearing including gear elements adapted to establish plural torque flow paths between said torque input shaft and said torque output shaft;

selectively engageable clutches and selectively engageable brakes adapted, respectively, to connect gear elements of said gearing together and to anchor gear elements of said gearing to provide torque reaction;

forward drive friction clutch means for connecting said torque input shaft to a torque input gear element of said gearing;

fluid pressure operated servo means for engaging and releasing said forward drive clutch means;

a transmission fluid pressure pump and a control valve circuit means for establishing controlled fluid pressure distribution from said pump to said forward drive clutch means including a solenoid operated pressure regulator valve;

first sensor means for sensing engine speed and second sensor means for sensing turbine speed whereby hydrokinetic slip of said hydrokinetic unit is monitoried;

electronic processor means for establishing a control signal for said regulator valve whereby clutch pressure delivered to said forward drive clutch means is controlled in response to changes in the difference between said engine speed and said turbine speed, said processor including means for effecting a closed loop control of pressure delivered to said forward drive clutch means during a neutral idle operating mode; and said processor including memory means for storing engine operating characteristic data including optimum commanded slip values, means for comparing said commanded slip values to said monitored slip and determining a difference therebetween, means for controlling said clutch pressure in accordance with said difference, and means for accelerating engagement of said forward drive clutch means in response to advancement of engine throttle.

2. The combination as set forth in claim 1 wherein said processor includes means for enabling said neutral idle operating mode when vehicle speed is above a predetermined value and for interrupting said neutral idle operating mode upon a decrease in said engine speed above a minimum value.

3. The combination as set forth in claim 2 wherein said control system includes means for delivering a brake signal to said processor when said brakes are applied, said processor including means for interrupting said neutral idle operating mode in response to the presence of said brake signal.

4. The combination as set forth in claim 1 wherein said processor includes means for effecting closed-loop control of said pressure during engagement, said forward drive clutch means being conditioned for engagement by a threshold pressure delivered to said forward drive clutch means during said neutral idle operating mode.

5. The combination as set forth in claim 2 wherein said processor includes means for effecting closed-loop control of said pressure during engagement, said forward drive clutch means being conditioned for engagement by a threshold pressure delivered to said forward drive clutch means during said neutral idle operating mode.

6. The combination as set forth in claim 3 wherein said processor includes means for effecting closed-loop control of said pressure during engagement, said forward drive clutch means being conditioned for engagement by a threshold pressure delivered to said forward drive clutch means during said neutral idle operating mode.

7. A control system for an automatic transmission for a vehicle with driver controlled brakes, said transmission being adapted to deliver torque from a throttle controlled vehicle engine to vehicle traction wheels;

said transmission including a hydrokinetic unit having an impeller and a turbine in a toroidal fluid flow circuit, said impeller being connected to said engine, a torque input shaft adapted to be connected to said turbine, a torque output shaft adapted to be connected to said traction wheels and multiple ratio gearing including gear elements adapted to establish plural torque flow paths between said torque input shaft and said torque output shaft;

selectively engageable clutches and selectively engageable brakes adapted, respectively, to connect gear elements of said gearing together and to anchor gear elements of said gearing to provide torque reaction;

forward drive friction clutch means for connecting said torque input shaft to a torque input gear element of said gearing;

fluid pressure operated servo means for engaging and releasing said forward drive clutch means;

a transmission fluid pressure pump and a control valve circuit means for establishing controlled fluid pressure distribution from said pump to said forward drive clutch means including a solenoid operated pressure regulator valve;

first sensor means for sensing engine speed and second sensor means for sensing turbine speed whereby hydrokinetic slip of said hydrokinetic unit is monitored;

electronic processor means for establishing a control signal for said regulator valve whereby clutch pressure delivered to said forward drive clutch means is controlled in response to changes in the difference between said engine speed and said turbine speed, said processor including means for effecting a closed loop control of pressure delivered to said forward drive clutch means during a neutral idle operating mode;

said processor including memory means for storing engine operating characteristic data including optimum commanded slip values, means for comparing said commanded slip values to said monitored slip and determining a difference therebetween, means for controlling said clutch pressure in accordance with said difference; and means for enabling said neutral idle operating mode when vehicle speed is above a predetermined value and for interrupting said neutral idle operating mode upon an increase in said engine speed above a minimum value.

8. The combination as set forth in claim 7 wherein said processor includes means for detecting whether said neutral operating mode has been repeated within a predetermined time and means for interrupting said neutral operating mode in response to detection of said repeated occurrence of said neutral operating mode.

* * * * *